(12) United States Patent
Fischer et al.

(10) Patent No.: US 8,903,346 B2
(45) Date of Patent: Dec. 2, 2014

(54) EXTERNAL MOUNTED AMPLIFIERS WITH ACTIVE INTERFERENCE CANCELATION USING DIVERSITY ANTENNAS

(75) Inventors: Larry G. Fischer, Waseca, MN (US); David Willey, Mound, MN (US); Chad Boeckman, Hutchinson, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 889 days.

(21) Appl. No.: 13/073,111

(22) Filed: Mar. 28, 2011

(65) Prior Publication Data

US 2012/0249212 A1    Oct. 4, 2012

(51) Int. Cl.
 *H04B 1/06* (2006.01)
 *H04B 7/00* (2006.01)
 *H04B 7/08* (2006.01)

(52) U.S. Cl.
 CPC ..................... *H04B 7/084* (2013.01)
 USPC ......... 455/276.1; 455/101; 455/272; 455/275

(58) Field of Classification Search
 CPC ...... H04B 1/406; H04B 1/006; H04B 7/0682; H04B 7/12; H04B 1/06; H04B 7/00
 USPC ................... 455/101, 103, 132, 189.1, 188.1, 455/190.1–191.1, 225, 269, 272–273, 455/275–277.1, 302–306, 562.1, 193.1, 455/194.1, 253.2
 See application file for complete search history.

(56) References Cited

U.S. PATENT DOCUMENTS

| 4,893,350 | A | 1/1990 | Minamisono et al. |
| 6,570,444 | B2 | 5/2003 | Wright |
| 7,092,681 | B2 * | 8/2006 | Rofougaran et al. ......... 455/103 |

(Continued)

FOREIGN PATENT DOCUMENTS

| WO | 2007144866 | 12/2007 |
| WO | 2008059485 | 5/2008 |
| WO | 2008059486 | 5/2008 |

OTHER PUBLICATIONS

Ahlstrom, "Digital Interference Cancellation in a Full Duplex System", "http://www.control.lth.se/documents/2008/5812_pop.pdf", Mar. 11, 2008, pp. 1-3, Publisher: Department of Automatic Control, Lund University, Sweden.

(Continued)

*Primary Examiner* — Pablo Tran
(74) *Attorney, Agent, or Firm* — Fogg & Powers LLC

(57) ABSTRACT

A system includes a first external mounted amplifier (EMA) having a first low-noise amplifier (LNA) coupled to a first antenna, a second EMA having a second LNA coupled to a second antenna, a first splitter coupled between the first antenna and the first LNA, a first phase shifter coupled to the first splitter, and a second mixer coupled to the first phase shifter. The first LNA is operable to receive a first input signal from first antenna. The second LNA is operable to receive a second input signal from second antenna. The first splitter is operable to derive a first sampling signal from first signal. The first phase shifter is operable to shift the phase of first sampling signal to create a second cancelation signal. The second mixer is operable to mix a second input signal derived from second signal with second cancelation signal to create a second output signal.

38 Claims, 26 Drawing Sheets

(56) References Cited

U.S. PATENT DOCUMENTS

| | | | | |
|---|---|---|---|---|
| 7,116,952 | B2* | 10/2006 | Arafa | 455/132 |
| 7,149,483 | B1* | 12/2006 | Reinisch et al. | 455/101 |
| 7,899,142 | B2* | 3/2011 | Hayashi et al. | 375/346 |
| 8,155,612 | B1* | 4/2012 | Husted et al. | 455/234.1 |
| 8,521,117 | B1* | 8/2013 | Gupta et al. | 455/296 |
| 2006/0172710 | A1* | 8/2006 | Cahana et al. | 455/101 |
| 2007/0135042 | A1 | 6/2007 | Shiff et al. | |
| 2008/0146183 | A1 | 6/2008 | Gebara et al. | |
| 2009/0117899 | A1 | 5/2009 | Shiff | |
| 2010/0048156 | A1 | 2/2010 | Hahn | |
| 2014/0099893 | A1* | 4/2014 | Kheirkhahi et al. | 455/41.2 |

OTHER PUBLICATIONS

Ayazian et al., "Dynamic Range Relaxation of Narrow-Band Receivers by Feedforward Interference Rejection", Dec. 18, 2006, Publisher: Electrical & Computer Engineering Department, University of Texas at Ausin, TX.

"Cellvine: Products and Solutions", "http://www.cellvine.com/modules.php?name=treeview&section_id=30&op=viewsection", Accessed on Oct. 27, 2010, Publisher: Cellvine.

"Cellvine: Tower Mount Amplifier", "http://www.cellvine.com/modules.php?name=treeview&section_id=30&category_id=160&op=tv_view_page", Accessed on Oct. 27, 2010, Publisher: Cellvine.

Gomes et al., "Interference Cancellation: New Configuration Technique for Cancellation of Strong Interferences From Adjacent Frequency ", "Integrated Nonlinear Microwave and Millimetre-Wave Circuits", Nov. 24-25, 2008, pp. 65-68, Publisher: IEEE.

"QHx220 Datasheet", "Active Isolation Enhancer and Interference Canceller Downloaded from http://www.intersil.com/data/fn/fn6986.pdf on Jul. 6, 2010", Oct. 20, 2009, pp. 1-19, Publisher: Intersil.

"QHx100 Narrowband Noise Canceller IC", "http://www.quellan.com/products/qhx100_ic.php", 2009, Publisher: Intersil.

"QHx230 Pre-Settable RF Noise Canceller IC", "http://www.quellan.com/products/qhx230_ic.php", 2009, Publisher: Intersil.

"Quellan Introduces Groundbreaking RF Noise Cancellation Technology ", "http://www.quellan.com/pressroom/press_releases/pr120706-rf-cancellation.html", Dec. 7, 2006, Publisher: Intersil.

"Qullan Raises Signal Strength Bars with Newest Noise Canceller", "http://www.quellan.com/pressroom/press_releases/pr010809-raises-signal-strength.html", Jan. 8, 2009, Publisher: Intersil, Published in: Las Vegas, Nevada.

"Local RF Interference Canceller", accessed on Dec. 4, 2009, Publisher: http://www.radiosky.com/canelit.html.

"QHx100 Radio Frequency Noise Canceller Product Brief", "http://www.quellan.com/pdfs/qhx100-pb.pdf", 2009.

"QHX230 Radio Frequency Noise Canceller Product Brief", "http://www.quellan.com/pdfs/qhx230-pb.pdf", 2009.

"Quellan's QHx220 Noise Canceller Makes Tokyo Debut", "http://www.quellan.com/pressroom/press_releases/pr082907-qhx220-debut.html", Aug. 31, 2007, Publisher: Intersil.

"SC1887: Adaptive RF Power Amplifier Linearizer Data Sheet", "http://www.scinteranetworks.com/pdfs/SC1887_Datasheet_v1.0.pdf", Jun. 2010, Publisher: Scintera.

"SC1887-EVK: SC1887 Evaluation Kit Revision 3", "http://www.scinteranetworks.com/pdfs/SC1887-EVK-REV3Datasheetpdf", Oct. 2010, Publisher: Scintera.

"Linearizing Microwave (4-80 GHz) Amplifiers with SC1887", "http://www.scinteranetworks.com/pdfs/SC1887_Microwave_Amplifers.pdf", Accessed on Oct. 21, 2010, Publisher: Scintera.

"SC1887-Single Chip Adaptive RF Predistortion", "http://www.scinteranetworks.com/pdfs/SC1887_productbrief.pdf", Accessed on Oct. 21, 2010, Publisher: Scintera.

Choma, "Short Course: Broadband and Radio Frequency Design in CMOS Technology ", "http://ee.usc.edu/assets/003/49710.pdf", Sep. 9, 2006, Publisher: Scintera.

* cited by examiner

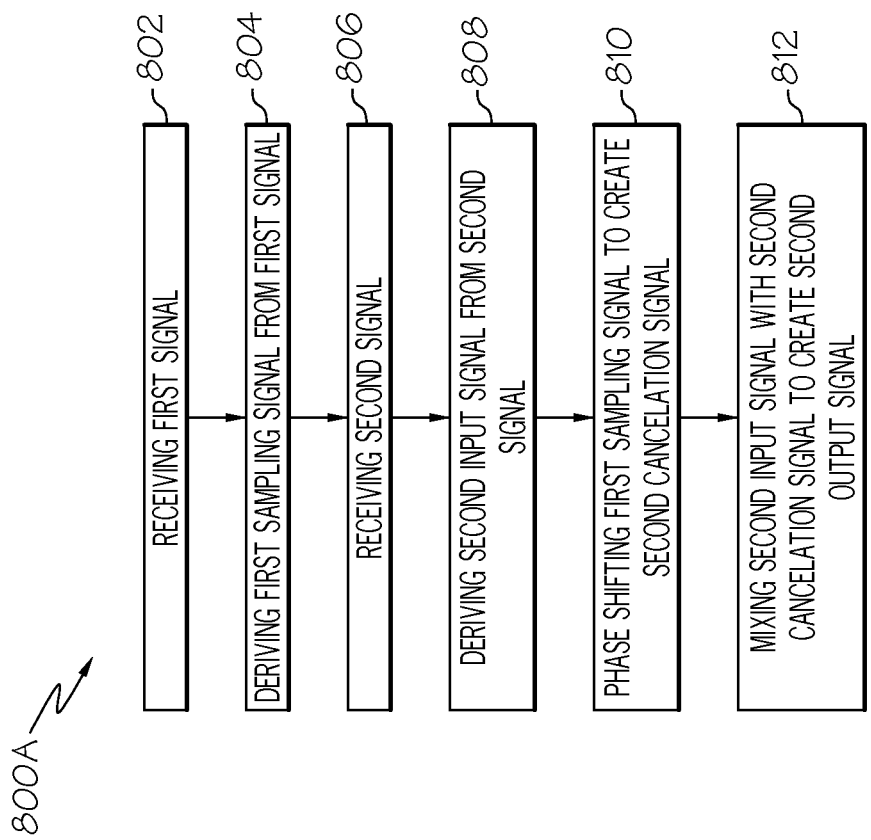

EXTERNAL MOUNTED AMPLIFIERS WITH ACTIVE INTERFERENCE CANCELATION USING DIVERSITY ANTENNAS

BACKGROUND

External mounted amplifiers (EMAs), such as tower mounted amplifiers (TMAs) and ground mounted amplifiers (GMAs) are a special class of low-noise amplifier that are mounted external to base station receivers and as close as possible to radiating antennas. EMAs, including TMAs and GMAs, are typically positioned outside of a base station receiver and are not tied electrically to the receiver for gain control. TMAs and GMAs are essentially the same, except for the mounting location of each type of EMA external to the radiating antennas. TMAs are mounted on towers and GMAs are mounted on the ground. GMAs are used to condition radio frequency (RF) signals received at the radiating antennas before the signals are sent to the receiver in the base station.

Some TMAs and GMAs include filters to limit the bandwidth that is amplified and to keep the corresponding transmitter signal from overloading the respective TMA or GMA. Filters are sometimes used to improve the signal to noise ratio (SNR) of signals received at radiating antennas by filtering noise and interference received with the signal at TMAs and GMAs. Improved SNRs enable the receiver to better demodulate the desired signals. TMAs and GMAs employ both low noise amplifiers and filters to improve the signal quality before presenting the desired signals to the receivers. Filters only remove the RF signals outside of the filters' pass-band. Thus, interferers within the filters' pass-band pass through unaffected.

SUMMARY

A system includes a first external mounted amplifier (EMA) having a first low-noise amplifier (LNA) coupled to a first antenna, a second EMA having a second LNA coupled to a second antenna, a first splitter coupled between the first antenna and the first LNA, a first phase shifter coupled to the first splitter, and a second mixer coupled to the first phase shifter. The first LNA is operable to receive a first input signal from first antenna. The second LNA is operable to receive a second input signal from second antenna. The first splitter is operable to derive a first sampling signal from first signal. The first phase shifter is operable to shift the phase of first sampling signal to create a second cancelation signal. The second mixer is operable to mix a second input signal derived from second signal with second cancelation signal to create a second output signal.

DRAWINGS

Understanding that the drawings depict only exemplary embodiments and are not therefore to be considered limiting in scope, the exemplary embodiments will be described with additional specificity and detail through the use of the accompanying drawings, in which:

FIGS. 8A-8B are flow diagrams of embodiments of methods of performing interference cancelation using an analog signal processor.

Figure 1:
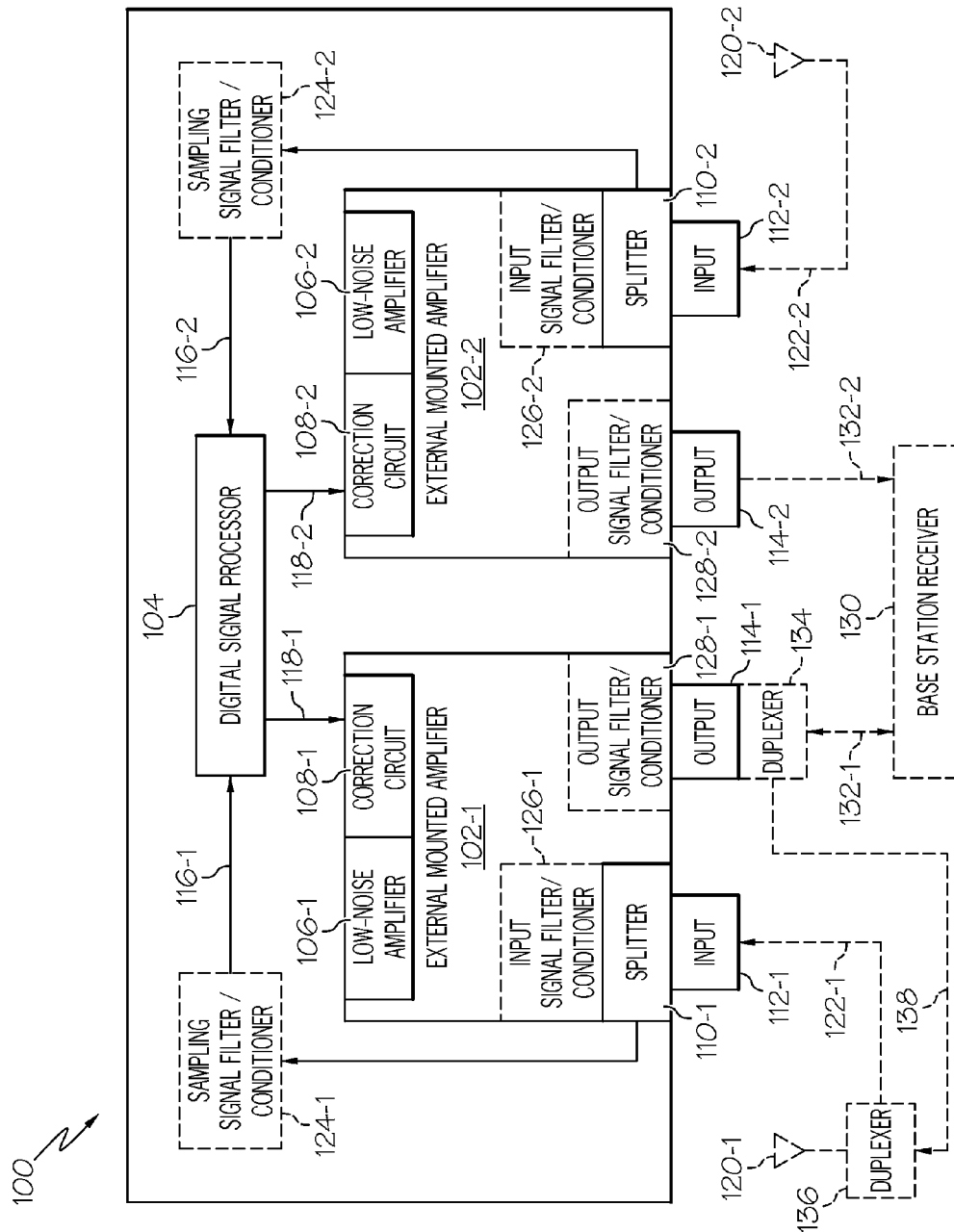
FIG. 1 is a block diagram of one embodiment of an interference canceling dual low-noise amplifier system having a digital signal processor element.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other example embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

As noted above in the background, external mounted amplifiers (EMAs) are a special class of low-noise amplifier that are mounted external to base station receivers and as close as possible to radiating antennas. External mounted amplifiers include tower mounted amplifiers (TMAs) and ground mounted amplifiers (GMAs).

FIG. 1 is a block diagram of one embodiment of an interference canceling dual low-noise amplifier system 100. The system 100 includes a first external mounted amplifier (EMA) 102-1, a second external mounted amplifier (EMA) 102-2, and a digital signal processor (DSP) 104. In example embodiments, the first EMA 102-1 and the second EMA 102-2 are tower mounted amplifiers (TMAs) or ground mounted amplifiers (GMAs). In other embodiments, other types of EMAs are used. While the DSP 104 is used to implement some of the functionality of system 100, other exemplary embodiments utilize discrete components or other programmable computing systems to implement the same functionality. Likewise, while discrete components, such as LNA 106-1 and splitter 110-1 described below, are used to implement some of the functionality of system 100, other exemplary embodiments utilize programmable computing systems or other discrete components to implement the same functionality. In example embodiments, the system 100 also includes a power supply and/or an external power connector and other inputs and outputs, such as a Universal Serial Bus (USB) connector and/or a 3-pin alarm connector.

The first EMA 102-1 includes a first low-noise amplifier (LNA) 106-1, a first correction circuit 108-1, a first splitter 110-1, a first input 112-1, a first output 114-1, a first sampling line 116-1, and a first cancelation signal line 118-1. The first input 112-1 is connected to a first antenna 120-1 via a first signal line 122-1 and receives a first signal (typically a radio frequency (RF) signal) from the first antenna 120-1. The splitter 110-1 splits the first signal into two identical signals, a first sampling signal and a first input signal. Thus, each of the first sampling signal and first input signal are derived from the first signal. The first sampling signal is communicated on the first sampling line 116-1. The first sampling signal is sampled as an input to the DSP 104 from the first sampling line 116-1 and is used to create a second cancelation signal for a second signal input into the second input 112-2 of the EMA 102-2 as described below. In some embodiments, an optional first sampling signal filter/conditioner 124-1 filters and/or conditions the first sampling signal between the splitter 110-1 and the DSP 104.

The DSP 104 outputs a first cancelation signal on the first cancelation signal line 118-1. The first cancelation signal is derived from the second signal and is described in detail below. The first cancelation signal is mixed with a first input signal derived from the first signal in the correction circuit 108-1. By mixing the first cancelation signal with the first input signal, undesired interference is canceled from the first input signal. Subsequently, the first mixed signal is amplified by LNA 106-1 and output via the first output 114-1. In some embodiment, an optional first input signal filter/conditioner 126-1 (such as a pass-band filter) filters and/or conditions the first input signal before it is mixed with the first cancelation signal. In some embodiments, an optional first output signal filter/conditioner 128-1 filters and/or conditions the first output signal before it is output via output 114-1.

In some embodiments of system 100, optional base station receiver 130 receives the first output signal from the first output 114-1 via first base station receiver signal line 132-1. In some embodiments, the optional base station receiver 130 sends a downlink signal to the first antenna 120-1 across the same first base station receiver signal line 132-1. In these embodiments, duplexer 134 is used to duplex both the first output signal and the downlink signal onto the same first base station receiver signal line 132-1. In these embodiments, duplexer 136 is used to duplex both the downlink signal carried on a downlink antenna signal line 138 and the first signal received from the first antenna 120-1 across the first signal line 122-1 onto the same first antenna 120-1. Thus, the same first antenna 120-1 can both receive the first signal and transmit the downlink antenna signal received from the base station receiver 130. While first and second signals are described with reference to embodiments described in this disclosure, it is understood that other signals can benefit from the systems and methods described herein.

The second EMA 102-2 includes a second low-noise amplifier (LNA) 106-2, a second correction circuit 108-2, a second splitter 110-2, a second input 112-2, a second output 114-2, a second sampling line 116-2, and a second cancelation signal line 118-2. The second input 112-2 is connected to a second antenna 120-2 via a second signal line 122-2 and receives a second signal (typically a radio frequency (RF) signal) from the second antenna 120-2. The splitter 110-2 splits the second signal into two identical signals, a second sampling signal and a second input signal. Thus, each of the second sampling signal and second input signal are derived from the second signal. The second sampling signal is communicated on the second sampling line 116-2. The second sampling signal is sampled as an input to the DSP 104 from the second sampling line 116-1 and is used to create a first cancelation signal for a first signal input into the first input 112-1 of the EMA 102-1 as described below. In some embodiments, an optional second sampling signal filter/conditioner 124-2 filters and/or conditions the second sampling signal between the splitter 110-2 and the DSP 104.

The DSP 104 outputs a second cancelation signal on the second cancelation signal line 118-2. The second cancelation signal is derived from the first signal and is described in detail below. The second cancelation signal is mixed with a second input signal derived from the second signal in the correction circuit 108-2. By mixing the second cancelation signal with the second input signal, undesired interference is canceled from the second input signal. Subsequently, the second mixed signal is amplified by LNA 106-2 and output via the second output 114-2. In some embodiment, an optional second input signal filter/conditioner 126-2 (such as a pass-band filter) filters and/or conditions the second input signal before it is mixed with the second cancelation signal. In some embodiments, an optional second output signal filter/conditioner 128-2 filters and/or conditions the second output signal before it is output via output 114-2.

In some embodiments of system 100, optional base station receiver 130 receives the second output signal from the second output 114-2 via second base station receiver signal line 132-2. The embodiment of system 100 shown in FIG. 1 only has an output to the base station receiver 130 across second base station receiver signal line 132-2. This is because the second antenna 120-2 is a diversity antenna to the main first antenna 120-1 and is only used for reception and not transmission. In other embodiments, the option base station receiver 130 sends a downlink signal to the second antenna 120-2 across the same second base station receiver signal line 132-2. In these embodiments, another duplexer is used to duplex both the second output signal and the downlink signal onto the same second base station receiver signal line 132-2. In these embodiments, another duplexer (not shown) is also used to duplex the downlink signal carried on another downlink antenna signal line (not shown) and the second signal received from the second antenna 120-2 across the second signal line 122-2 onto the same second antenna 120-2. Thus, in these embodiments the same second antenna 120-2 can both receive the first signal and transmit the downlink antenna signal received from the base station receiver 130. In other embodiments, there may be greater amounts of diversity antennas with either only reception or both reception and transmission capabilities.

In some example embodiments, there is spatial diversity or polarization diversity between the first antenna 120-1 and the second antenna 120-2. When there is spatial diversity or polarization diversity between the first antenna 120-1 and the second antenna 120-2, the first antenna 120-1 receives a given signal along a different signal path than second antenna 120-2. Thus, the signals received at the first antenna 120-1 and the second antenna 120-2 are shifted in phase from one another. In other example embodiments, there are other types of diversity between the first antenna 120-1 and the second antenna 120-2.

In some example embodiments, signal filters are used to filter various signals in the system. As noted above regarding some example embodiments, the first sampling signal filter/conditioner 124-1 filters the first sampling signal communicated across the first sampling line 116-1 before it is input into the DSP 104. As noted above regarding some example embodiments, a second sampling signal filter/conditioner 124-2 filters the second sampling signal communicated across the second sampling line 116-2 before it is input into the DSP 104. In some example embodiments, it is undesirable to have any filtering or conditioning on either first or second sampling signals, as the filtering could augment or remove the noise and interference present in either sampling signal that is necessary to create the corresponding cancelation signal. In some examples, augmentation or removal of the noise and interference present in either sampling signal would have a negative impact on the quality and accuracy of the cancelation signal created from a sampling signal. By avoiding augmentation or removal of the noise and interference present in either sampling signal through a filter, such as a band-pass filter, the noise and interference in either sampling signal is strong relative to the signal.

As noted above regarding some example embodiments, a first input signal filter/conditioner 126-1 (such as a pass-band filter) filters the first input signal before it is input into the LNA 106-1. As noted above regarding some example embodiments, a second input signal filter/conditioner 126-2 (such as a pass-band filter) filters the second input signal before it is input into the LNA 106-2. While filtering of the first or second input signal after being split from the sampling signal will not have impact on the creation of a cancelation signal, in some example embodiments it may be undesirable to filter or condition the first or second input signal before mixing each input signal with its associated cancelation signal. For example, in some example embodiments if the input signal is filtered before being mixed with the cancelation signal, the cancelation signal may not be able to accurately remove the noise and interference present in the associated signal through a direct mix with the input signal. In these examples, it may be necessary to amplify or attenuate various frequencies of either an input signal or its associated cancelation signal by using amplifiers or attenuators as described below.

As noted above regarding some example embodiments, a first output signal filter/conditioner 128-1 filters the first output signal before it is output by first output 114-1. As noted above regarding some example embodiments, a second output signal filter/conditioner 128-2 filters the second output signal before it is output by the second output 114-2. While filtering or conditioning of either the first output signal or the second output signal is unlikely to impact the proper cancelation of the noise and interference present in a particular input signal, in some example embodiments it is undesirable to have any filtering or conditioning on the output signal.

While the filters described in the specification and shown in the figures are shown as single components, each filter may include any number or type of filters or conditioners appropriate for performing the desired function. While the filters and conditioners are generally described in the specification and shown in the figures as elements of various components of the system, such as the EMA 102-1 or EMA 102-2, it is understood that the filters/conditioners could also be implemented in other areas of the system, such as for example in the DSP 104 or in LNA 106-1 or LNA 106-2. The filters described above are shown as optional elements in other figures as well and can be implemented in the other figures as described above.

As described below, embodiments of the DSP 104 in combination with at least one LNA 106 and other components in the system 100 are operable to adjust the phase of the digitized first sampling signal and the digitized second sampling signal, along with the gain, attenuation, and filtering of various signals, including the first input signal, the first cancelation signal, the first output signal, the second input signal, the second cancelation signal, and the second output signal. By adjusting the phase of the cancelation signals and the gain, attenuation, and filtering of the various signals, the DSP 104 in combination with at least one LNA can effectively reduce noise and interference from an output signal that was present in an input signal received at least one antenna 120.

In some example embodiments, DSP 104 controls the amount of phase shift introduced by the phase shifters and the amount of amplification, attenuation, and filtering applied to the various signals described below. In some example embodiments, the DSP 104 includes a processor as described below to adjust the amount of phase shift, amplification, attenuation, and filtering of the various signals. In some example embodiments, LNA 106-1 and LNA 106-2 control the amount of amplification, attenuation, and filtering applied to the various signals described below in addition to the manner of mixing the input signals with the cancelation signals as described below. In some example embodiments, LNA 106-1 and LNA 106-2 each include a processor as described below to adjust the amount of amplification, attenuation, and filtering of the various signals. In some embodiments, there is coordinating communication between the DSP 104 and the LNA 106-1 and LNA 106-2 (and potentially other components of the system 100) that allows the DSP 104 and the LNA 106-1 and LNA 106-2 to work in concert to adjust phase, amplitude, and filtering of the various signals. While the embodiments below describe phase shift, amplification, attenuation, filtering, etc. generally occurring in DSP 104, LNA 106-1, and LNA 106-2, in some example embodiments the EMA 102-1 and EMA 102-2 include processors (outside of LNA 106-1 and LNA 106-2) to adjust the phase, amplitude, and filtering of various signals.

FIGS. 2A-2H are functional block diagrams of embodiment of the digital signal processor (DSP) 104. Each of FIGS. 2A-2H shows a different embodiment of DSP 104. The various embodiments are labeled DSP 104A through DSP 104H.

Figure 2A:
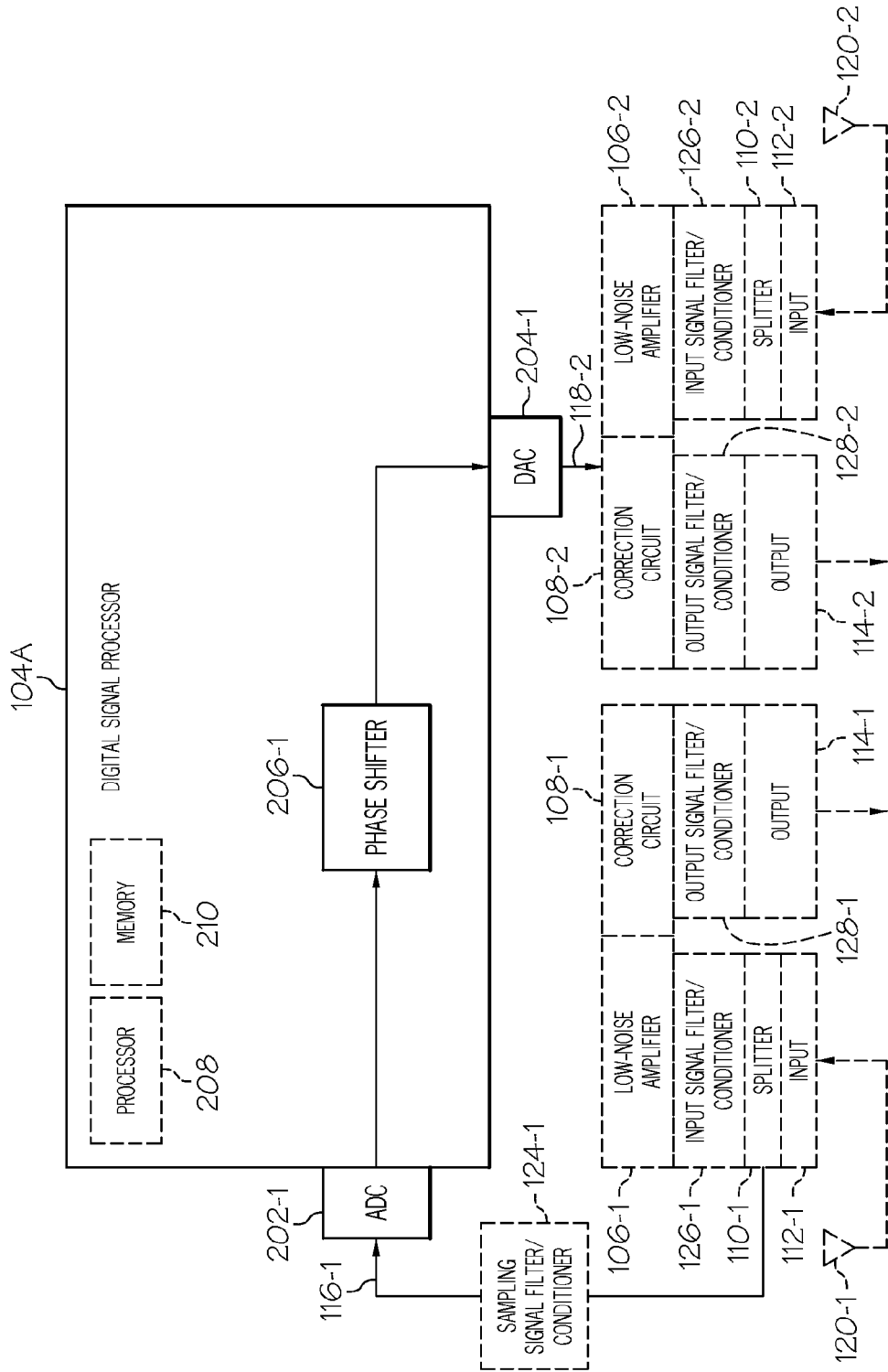
FIGS. 2A-2H are functional block diagrams of embodiments of a digital signal processor element of the system of FIG. 1.

FIG. 2A shows one exemplary embodiment of the DSP 104, labeled DSP 104A. The DSP 104A includes a first analog-to-digital converter (ADC) 202-1, a first digital-to-analog converter (DAC) 204-1, and a first phase shifter 206-1. The first ADC 202-1 converts the received analog first sampling signal into a digital signal for processing by the DSP 104A. The first phase shifter 206-1 digitally shifts the phase of the digitized first sampling signal to create the second cancelation signal that is converted by the first DAC 204-1 from a digital signal to an analog signal. In some example embodiments, the first phase shifter 206-1 is an inverter that shifts the first sampling signal by 180 degrees. In other example embodiments, the phase shift applied by the first phase shifter 206-1 can be adjusted based on timing, temperature changes, and other variables to create the second cancelation signal that will reduce and/or cancel the noise and interference present in the second signal. In some example embodiments, the entire first sampling signal is shifted. In other example embodiments, only specific bands of the first sampling signal where noise and interference are likely present are shifted. The second cancelation signal is output to the second LNA 106-2 across the second cancelation signal line 118-2.

In some example embodiments, DSP 104A also includes a processor 208 that is operable to control the amount of phase shift applied to the digitized first sampling signal by the phase shifter 206-1. In some embodiments, the phase shifter 206-1 is adjusted based on preset variables programmed into a memory 210 by a user. These variables can be changed by a user via an interface with the DSP 104A. In some embodiments, these variables indicate the desired amount of phase shift. In some embodiments, the variables also indicate a band in which the phase shift should occur.

In some example embodiments, the processor 208 adjusts the amount of phase shift applied to the digitized first sampling signal by analyzing the digitized first sampling signal to determine what amount of phase shift would create a second cancelation signal that would reduce the noise and interference in the second signal acceptably. In some example embodiments, DSP 104A performs an FFT analysis on the digitized first sampling signal to determine how much phase shift to apply to the digitized first sampling signal to create the second cancelation signal. Specifically, the FFT analysis can look at the peak power or power density of the first sampling signal to determine when interferers and/or distortions are occurring. In some example embodiments, a history is created of the amount of phase shift necessary to create an appropriate correction signal. The processor 208 then uses this history while controlling the phase shifter 206-1 to make the corrections.

In some example embodiments, DSP 104A selectively performs the phase shift only on signals in a noise band of interest where the noise and interference are present, thereby creating a second cancelation signal that only removes noise from the noise band of interest. In some embodiments, the first ADC 202-1 and the first DAC 204-1 are part of the DSP 104. In other embodiments, the first ADC 202-1 and the first DAC 204-1 are separate components outside of the DSP 104.

Figure 2B:
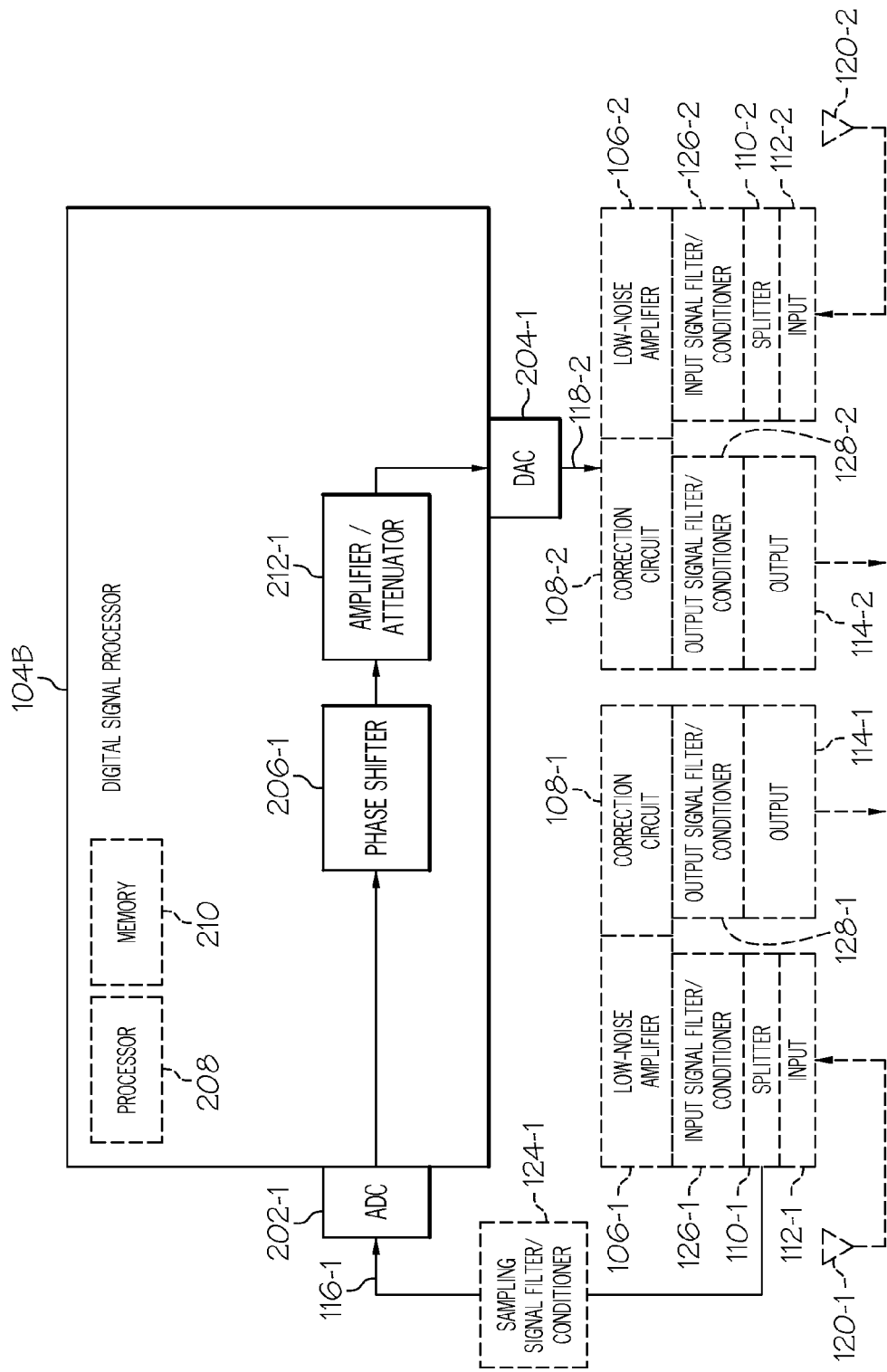

FIG. 2B shows another exemplary embodiment of the DSP 104, labeled DSP 104B. The DSP 104B includes all the same components as DSP 104A discussed above, which operate according to the description above. Additionally, DSP 104B includes an amplifier/attenuator 212-1. The digitized second cancelation signal is either amplified or attenuated by the amplifier/attenuator 212-1 and output to the second LNA 106-2 across the second cancelation signal line 118-2. The digitized second cancelation signal is amplified or attenuated so that it is at an appropriate amplification to reduce and/or cancel the effects of noise and interference present in the second signal. In some example embodiments, the amplifier/attenuator 212-1 is an amplifier, an attenuator, or both an amplifier and an attenuator. In some example embodiments, alternative signal level adjustment devices are used instead of an amplifier and/or an attenuator.

In some example embodiments, DSP 104B also includes the optional processor 208 that is operable to control the amount of phase shift applied to the digitized first sampling signal by the phase shifter 206-1 and/or the amount of amplification and/or attenuation provided by the amplifier/attenuator 212-1. In some embodiments, the phase shifter 206-1 is adjusted based on preset variables programmed into a memory 210 by a user. These variables can be changed by a user via an interface with the DSP 104B. In some embodiments, these variables indicate the desired amount of phase shift and/or amplification or attenuation to create a second cancelation signal that would reduce the noise and interference in the second signal acceptably. In some example embodiments, processor 208 analyzes the digitized first sampling signal to determine what amount of phase shift and amplification and/or attenuation would create a second cancelation signal that would reduce the noise and interference in the second signal acceptably. As noted above with reference to DSP 104A, this could be done through an FFT analysis. As with DSP 104A described above, in some example embodiments, DSP 104B selectively performs the phase shift and signal amplification and/or attenuation only on signals in a noise band of interest where the noise and interference are present, thereby creating a second cancelation signal that only removes noise from the noise band of interest.

Figure 2C:
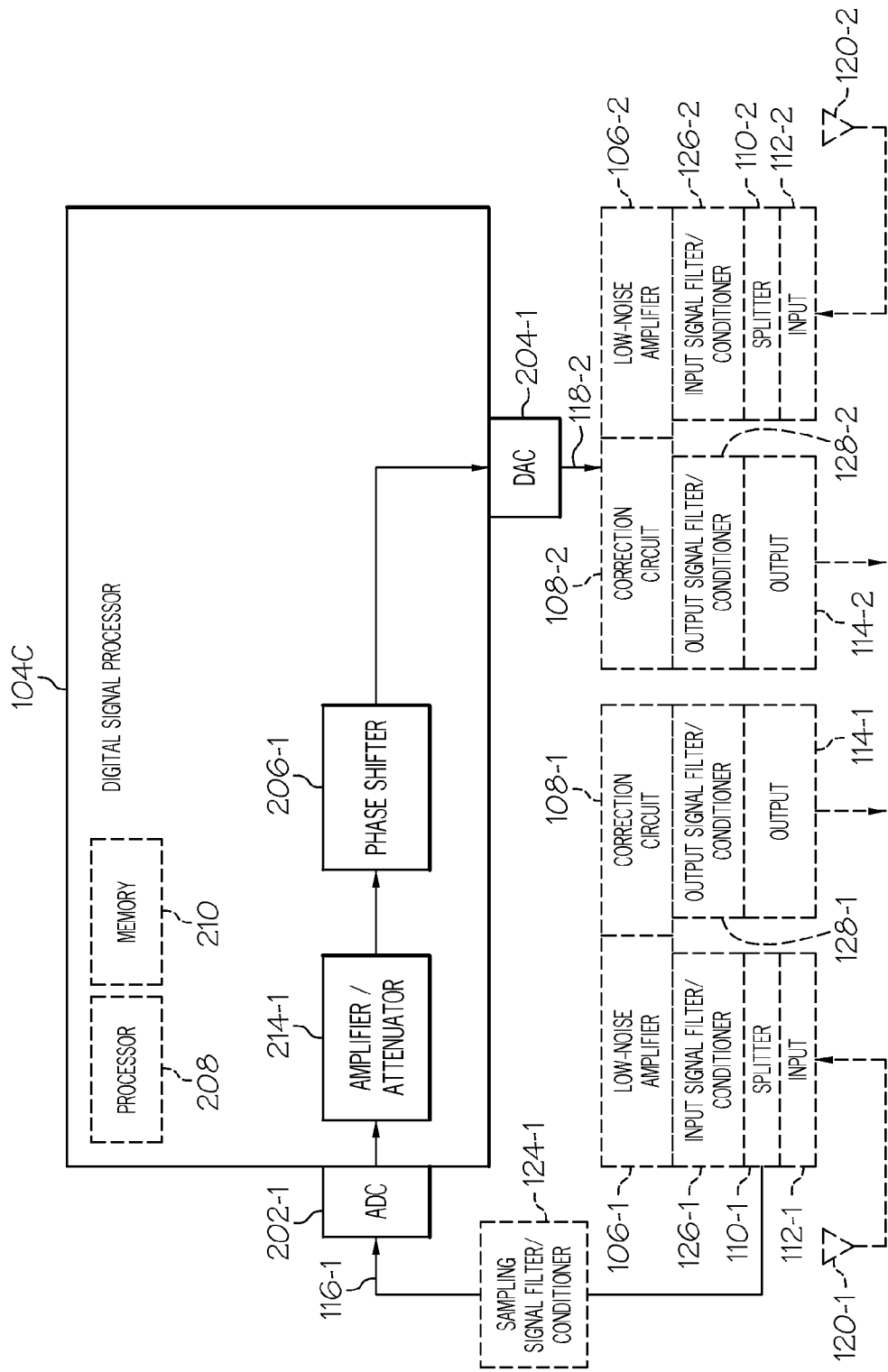

FIG. 2C shows another exemplary embodiment of the DSP 104, labeled DSP 104C. The DSP 104C includes all the same components as DSP 104A discussed above, which operate according to the description above. Additionally, DSP 104C includes an amplifier/attenuator 214-1. The amplifier/attenuator 214-1 either amplifies or attenuates the digitized first sampling signal. The digitized first sampling signal is amplified or attenuated so that the digitized second cancelation signal is at an appropriate amplification to reduce and/or cancel the effects of noise and interference present in the second signal. In some example embodiments, the amplifier/attenuator 214-1 is an amplifier, an attenuator, or both an amplifier and an attenuator. In some example embodiments, alternative signal level adjustment devices are used instead of an amplifier and/or an attenuator.

In some example embodiments, DSP 104C also includes the optional processor 208 that is operable to control the amount of phase shift applied to the digitized first sampling signal by the phase shifter 206-1 and/or the amount of amplification and/or attenuation provided by the amplifier/attenuator 212-1. In some embodiments, the phase shifter 206-1 is adjusted based on preset variables programmed into a memory 210 by a user. These variables can be changed by a user via an interface with the DSP 104A. In some embodiments, these variables indicate the desired amount of phase shift. In some example embodiments, processor 208 analyzes the digitized first sampling signal to determine what amount of phase shift and amplification and/or attenuation would create a second cancelation signal that would reduce the noise and interference in the second signal acceptably. As noted above with reference to DSP 104A, this could be done through an FFT analysis. As with DSP 104A described above, in some example embodiments, DSP 104C selectively performs the phase shift and signal amplification and/or attenuation only on signals in a noise band of interest where the noise and interference are present, thereby creating a second cancelation signal that only removes noise from the noise band of interest.

Figure 2D:
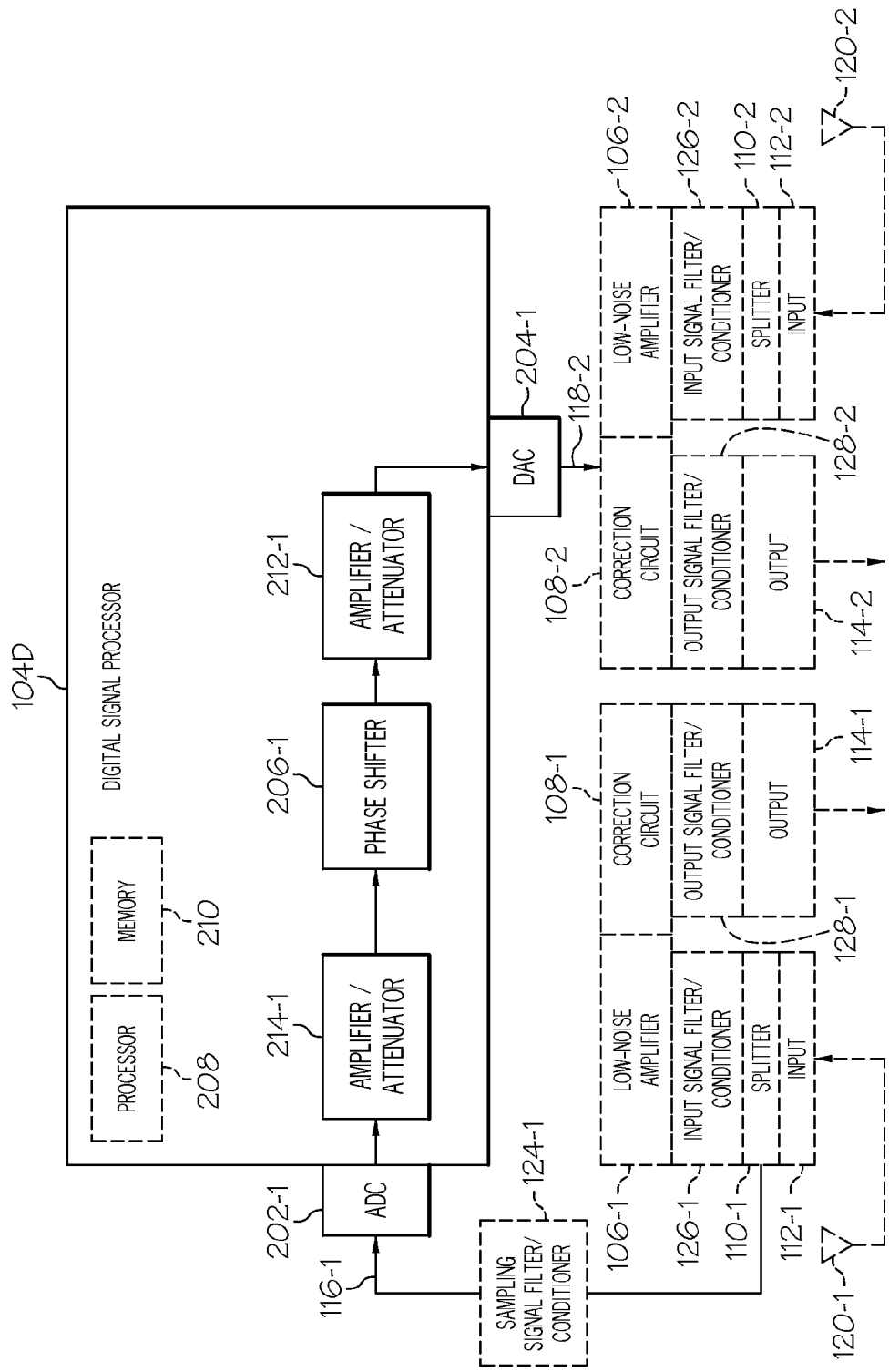

FIG. 2D shows another exemplary embodiment of the DSP 104, labeled DSP 104D. The DSP 104D includes all the same components as DSP 104A discussed above, which operate according to the description above. Additionally, DSP 104D includes the amplifier/attenuator 212-1 and the amplifier/attenuator 214-1 described with reference to FIG. 2B and FIG. 2C respectively. Both of these amplifier/attenuators operate according to their descriptions above. As noted above, in some embodiments, processor 208 is operable to control the amount of phase shift applied to the digitized first sampling signal by the phase shifter 206-1 and/or the amount of amplification and/or attenuation provided by the amplifier/attenuators 212-1 and 214-1. In some embodiments, the phase shifter 206-1 is adjusted based on preset variables programmed into a memory 210 by a user. These variables can be changed by a user via an interface with the DSP 104D. In some embodiments, these variables indicate the desired amount of phase shift. In some example embodiments, processor 208 analyzes the digitized first sampling signal to determine what amount of phase shift and amplification and/or attenuation would create a second cancelation signal that would reduce the noise and interference in the second signal acceptably. As noted above with reference to DSP 104A, this could be done through an FFT analysis. As with DSP 104A described above, in some example embodiments, DSP 104D selectively performs the phase shift only on signals in a noise band of interest where the noise and interference are present, thereby creating a second cancelation signal that only removes noise from the noise band of interest.

Figure 2E:
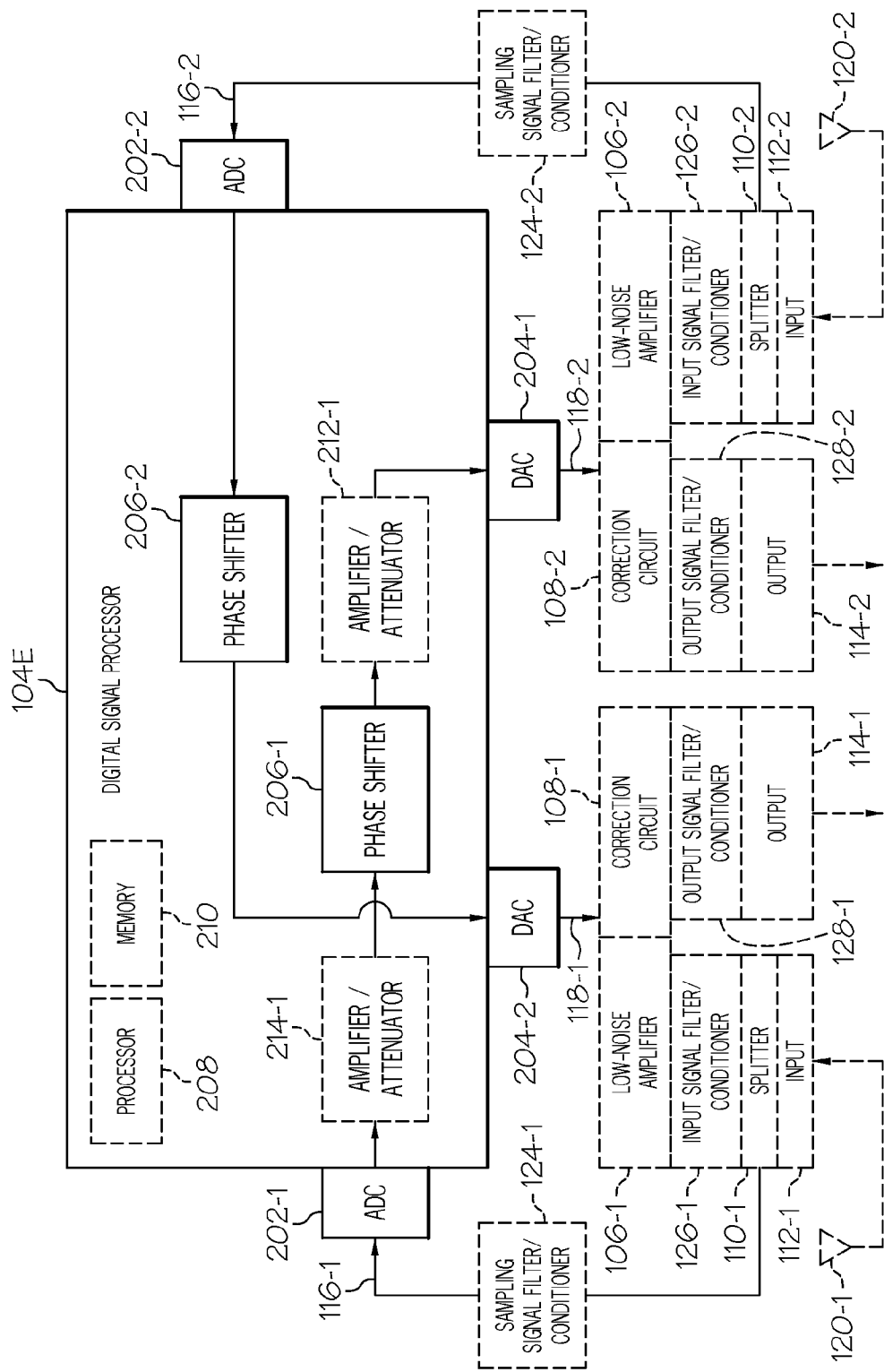

FIG. 2E shows another exemplary embodiment of the DSP 104, labeled DSP 104E. The DSP 104E includes a second analog-to-digital converter (ADC) 202-2, a second digital-to-analog converter (DAC) 204-2, and a second phase shifter 206-2 in addition to the first ADC 202-1, the first DAC 204-1, and the first phase shifter 206-1. The first ADC 202-1, the first DAC 204-1, and the first phase shifter 206-1 operate according to the description of DSP 104A-104D shown in FIGS. 2A-2D and described above. The second ADC 202-2 converts the received analog second sampling signal into a digital signal for processing by the DSP 104E.

The second phase shifter 206-2 digitally shifts the phase of the digitized second sampling signal to create the first cancelation signal that is converted by the second DAC 204-2 from a digital signal to an analog signal. In some example embodiments, the second phase shifter 206-2 is an inverter that shifts the second sampling signal by 180 degrees. In other example embodiments, the second phase shifter 206-2 adjusts the amount of phase shift applied to the second sampling signal based on timing, temperature changes, and other variables to create the first cancelation signal that will reduce and/or cancel out the noise and interference present in the second signal. In some example embodiments, the entire second sampling signal is shifted. In other example embodiments, only specific bands of the second sampling signal where noise and interference are likely present are shifted. The first cancelation signal is output to the first LNA 106-1 across the first cancelation signal line 118-1.

In some example embodiments, DSP 104E also includes the processor 208 that is operable to control the amount of phase shift applied to the digitized second sampling signal by the phase shifter 206-2. In some embodiments, the phase shifter 206-2 is adjusted based on preset variables programmed into a memory 210 by a user. These variables can be changed by a user via an interface with the DSP 104E. In some embodiments, these variables indicate the desired amount of phase shift. In some example embodiments, processor 208 analyzes the digitized second sampling signal to determine what amount of phase shift would create a first cancelation signal that would reduce the noise and interference in the first signal acceptably. In some example embodiments, DSP 104E performs an FFT analysis on the second sampling signal to determine how much phase shift to apply to the second sampling signal to create the first cancelation signal. Specifically, the FFT analysis can look at the peak power or power density of the second sampling signal to determine when interferes and/or distortions are occurring. In some example embodiments, a history is created of the amount of phase shift necessary to create an appropriate correction signal. The processor 208 then uses this history while controlling the phase shifter 206-2 to make the corrections.

In some example embodiments DSP 104E selectively performs the phase shift only on signals in a noise band of interest where the noise and interference are present, thereby creating a first cancelation signal that only removes noise from the noise band of interest. In some embodiments, the first ADC 202-2 and the first DAC 204-2 are part of the DSP 104. In other embodiments, the first ADC 202-2 and the first DAC 204-2 are separate components outside of the DSP 104. In some example embodiments, the DSP 104E also includes other optional components, such as the component amplifier/attenuator 212-1 and the amplifier/attenuator 214-1. These optional components also operate according to the description of DSP 104A-104D shown in FIGS. 2A-2D and described above.

Figure 2F:
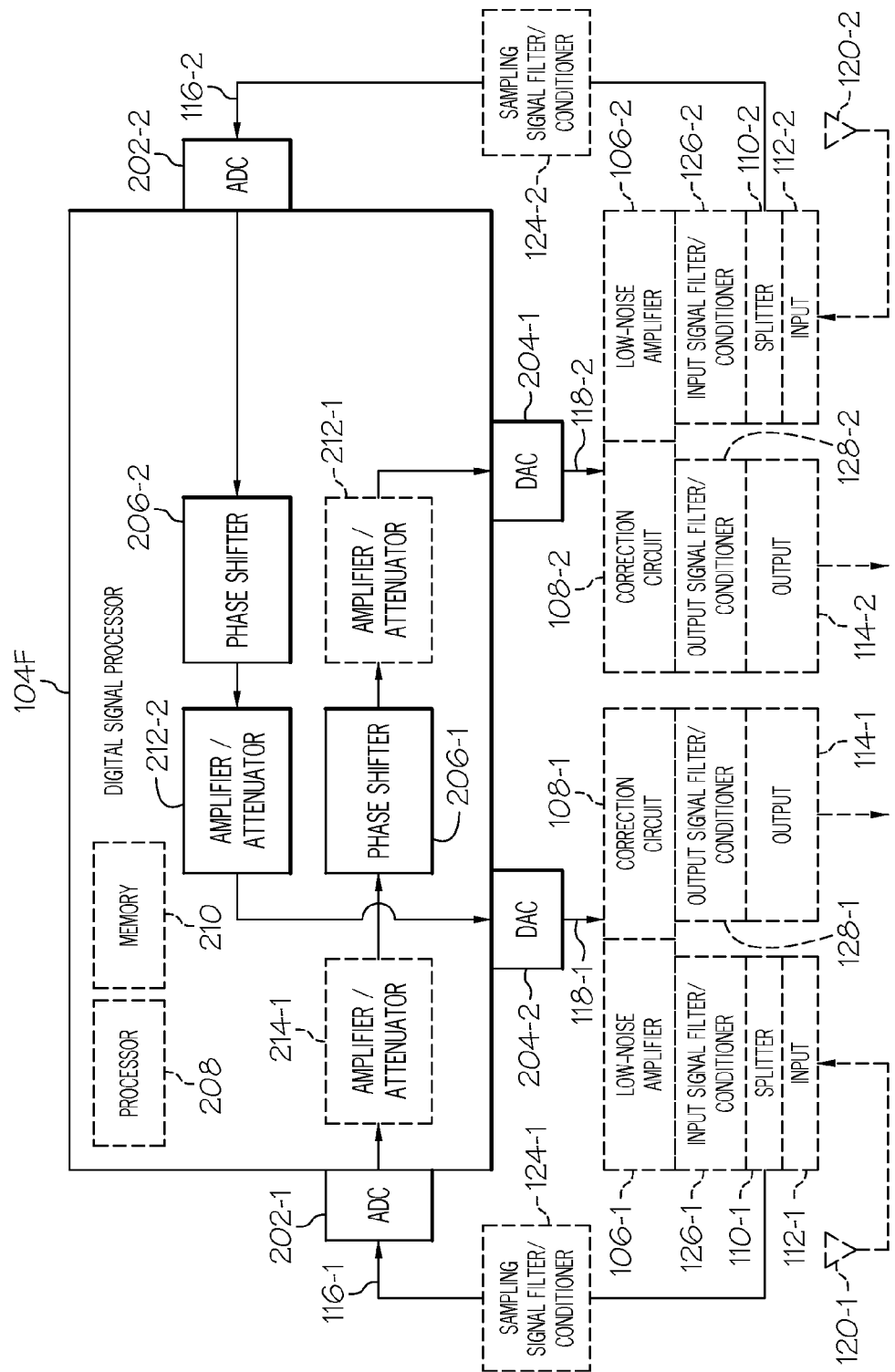

FIG. 2F shows another exemplary embodiment of the DSP 104, labeled DSP 104F. The DSP 104F includes all the same components as DSP 104E discussed above, which operate according to the description above. Additionally, DSP 104F includes an amplifier/attenuator 212-2. The digitized first cancelation signal is either amplified or attenuated by the amplifier/attenuator 212-2 and output to the first LNA 106-1 across the first cancelation signal line 118-1. The digitized first cancelation signal is amplified or attenuated so that it is at an appropriate amplification to reduce and/or cancel the effects of noise and interference present in the first signal. In some example embodiments, the amplifier/attenuator 212-2 is an amplifier, an attenuator, or both an amplifier and an attenuator. In some example embodiments, alternative signal level adjustment devices are used instead of an amplifier and/or an attenuator. In some example embodiments, the DSP 104F also includes other optional components, such as the component amplifier/attenuator 212-1 and the amplifier/attenuator 214-1. These optional components also operate according to the description of DSP 104A-104D shown in FIGS. 2A-2D and described above.

In some example embodiments, DSP 104F also includes the optional processor 208 that is operable to control the amount of phase shift applied to the digitized second sampling signal by the phase shifter 206-2 and/or the amount of amplification and/or attenuation provided by the amplifier/attenuator 212-2. In some embodiments, the phase shifter 206-2 is adjusted based on preset variables programmed into a memory 210 by a user. These variables can be changed by a user via an interface with the DSP 104F. In some embodiments, these variables indicate the desired amount of phase shift. In some example embodiments, processor 208 analyzes the digitized second sampling signal to determine what amount of phase shift and amplification and/or attenuation would create a first cancelation signal that would reduce the noise and interference in the first signal acceptably. As noted above with reference to DSP 104E, this could be done through an FFT analysis. As with DSP 104E described above, in some example embodiments, DSP 104F selectively performs the phase shift and signal amplification and/or attenuation only on signals in a noise band of interest where the noise and interference are present, thereby creating a first cancelation signal that only removes noise from the noise band of interest.

Figure 2G:
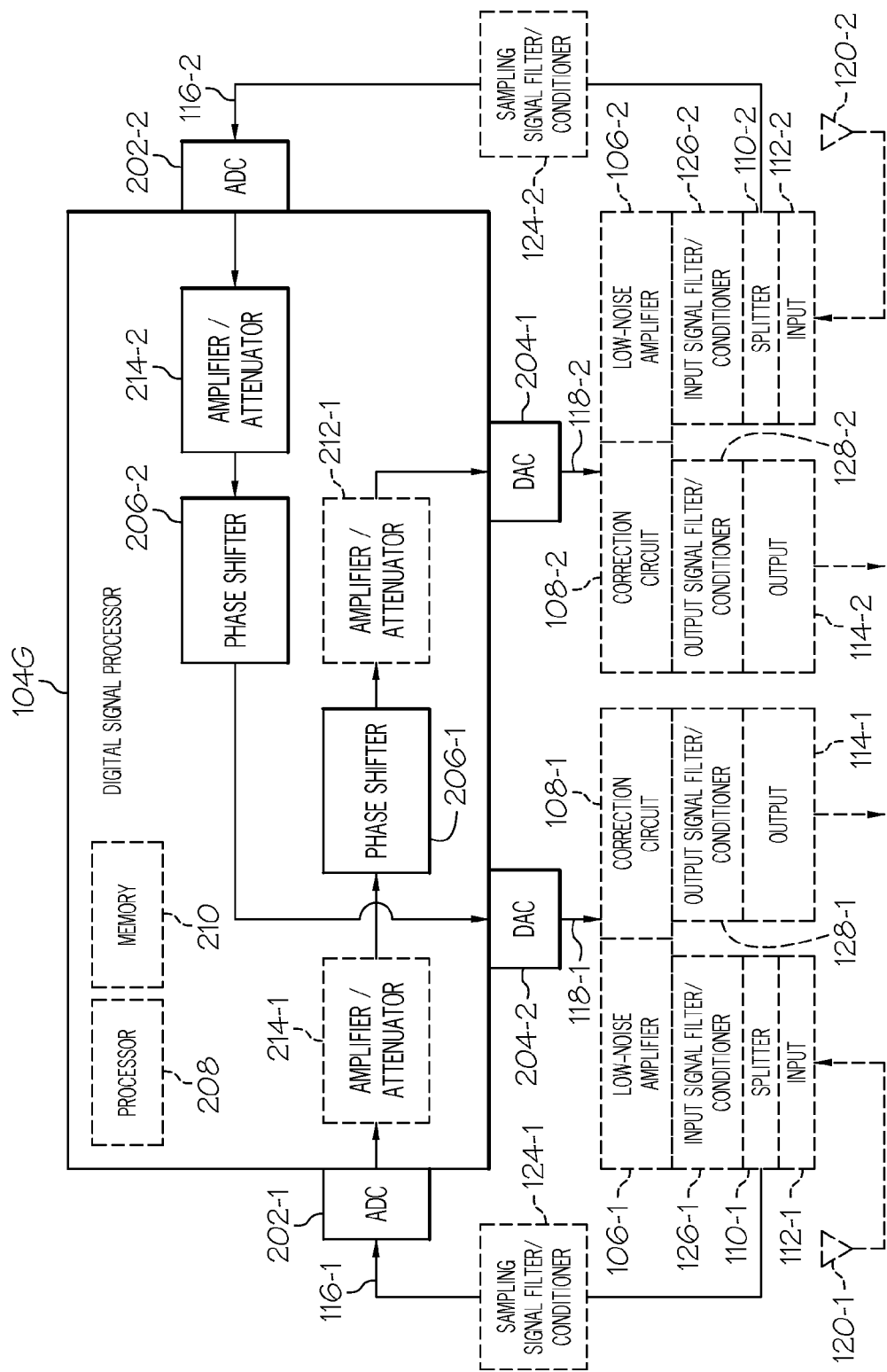

FIG. 2G shows another exemplary embodiment of the DSP 104, labeled DSP 104G. The DSP 104G includes all the same components as DSP 104E discussed above, which operate according to the description above. Additionally, DSP 104G includes an amplifier/attenuator 214-2. The amplifier/attenuator 214-2 either amplifies or attenuates the digitized second sampling signal. The digitized second sampling signal is amplified or attenuated so that the digitized first cancelation signal is at an appropriate amplification to reduce and/or cancel the effects of noise and interference present in the first signal. In some example embodiments, the amplifier/attenuator 214-1 is an amplifier, an attenuator, or both an amplifier and an attenuator. In some example embodiments, alternative signal level adjustment devices are used instead of an amplifier and/or an attenuator. In some example embodiments, the DSP 104G also includes other optional components, such as the component amplifier/attenuator 212-1 and the amplifier/attenuator 214-1. These optional components also operate according to the description of DSP 104A-104D shown in FIGS. 2A-2D and described above.

In some example embodiments, DSP 104G also includes the optional processor 208 that is operable to control the amount of phase shift applied to the digitized second sampling signal by the phase shifter 206-2 and/or the amount of amplification and/or attenuation provided by the amplifier/attenuator 212-2. In some embodiments, the phase shifter 206-2 is adjusted based on preset variables programmed into a memory 210 by a user. These variables can be changed by a user via an interface with the DSP 104G. In some embodiments, these variables indicate the desired amount of phase shift. In some example embodiments, processor 208 analyzes the digitized second sampling signal to determine what amount of phase shift and amplification and/or attenuation would create a first cancelation signal that would reduce the noise and interference in the first signal acceptably. As noted above with reference to DSP 104E, this could be done through an FFT analysis. As with DSP 104E described above, in some example embodiments, DSP 104G selectively performs the phase shift and signal amplification and/or attenuation only on signals in a noise band of interest where the noise and interference are present, thereby creating a first cancelation signal that only removes noise from the noise band of interest.

Figure 2H:
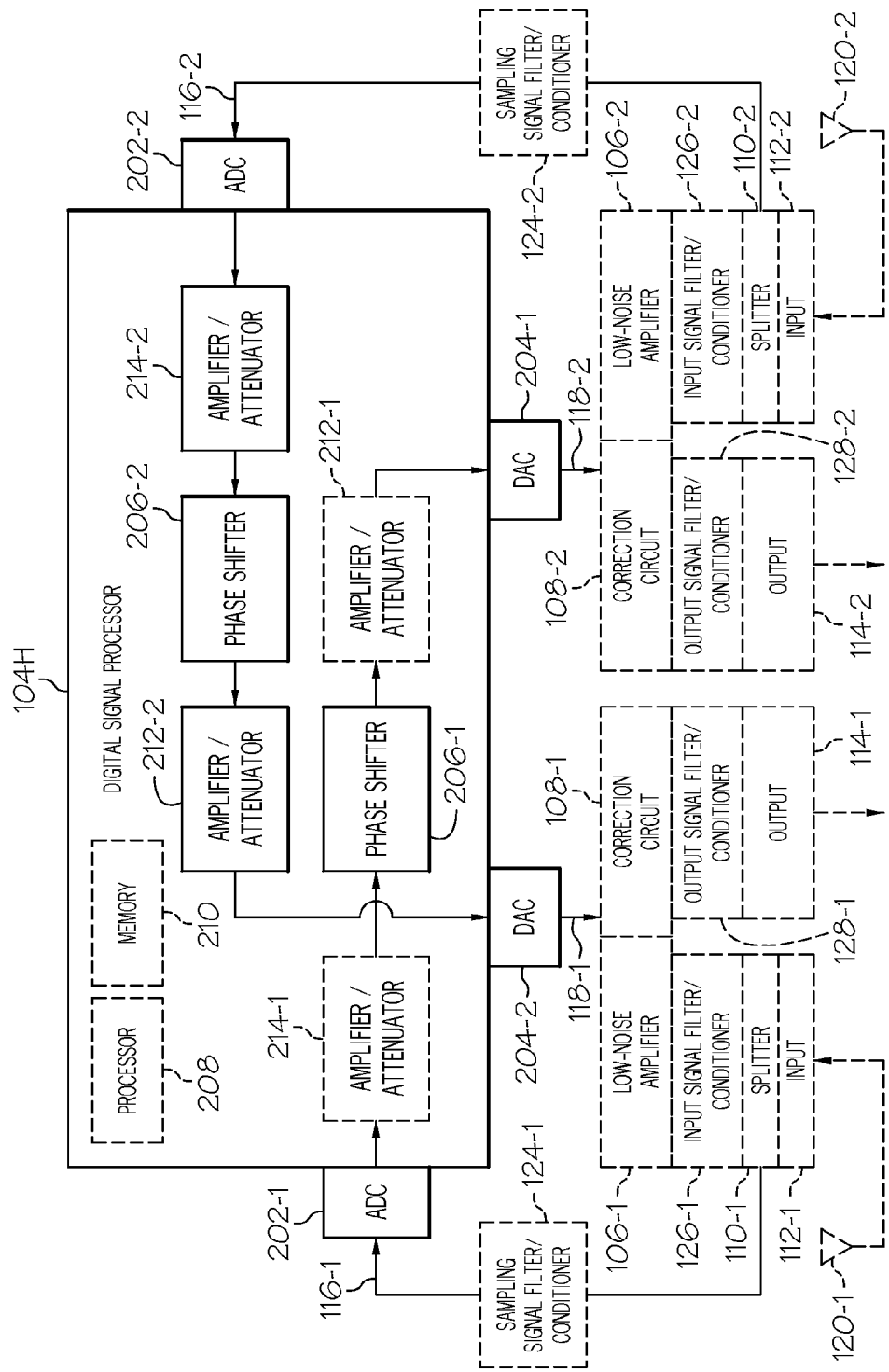

FIG. 2H shows another exemplary embodiment of the DSP 104, labeled DSP 104H. The DSP 104H includes all the same components as DSP 104H discussed above, which operate according to the description above. Additionally, DSP 104H includes the amplifier/attenuator 212-2 and the amplifier/attenuator 214-2 described with reference to FIG. 2F and FIG. 2G respectively. Both of these amplifier/attenuators operate according to their descriptions above. In some example embodiments, the DSP 104H also includes other optional components, such as the component amplifier/attenuator 212-1 and the amplifier/attenuator 214-1. These optional components also operate according to the description of DSP 104A-104D shown in FIGS. 2A-2D and described above.

As noted above, in some embodiments, processor 208 is operable to control the amount of phase shift applied to the digitized second sampling signal by the phase shifter 206-2 and/or the amount of amplification and/or attenuation provided by the amplifier/attenuators 212-2 and 214-2. In some embodiments, the phase shifter 206-2 is adjusted based on preset variables programmed into a memory 210 by a user. These variables can be changed by a user via an interface with the DSP 104H. In some embodiments, these variables indicate the desired amount of phase shift. In some example embodiments, processor 208 analyzes the digitized second sampling signal to determine what amount of phase shift and amplification and/or attenuation would create a first cancelation signal that would reduce the noise and interference in the first signal acceptably. As noted above with reference to DSP 104E, this could be done through an FFT analysis. As with DSP 104E described above, in some example embodiments, DSP 104H selectively performs the phase shift only on signals in a noise band of interest where the noise and interference are present, thereby creating a first cancelation signal that only removes noise from the noise band of interest.

Figure 3:
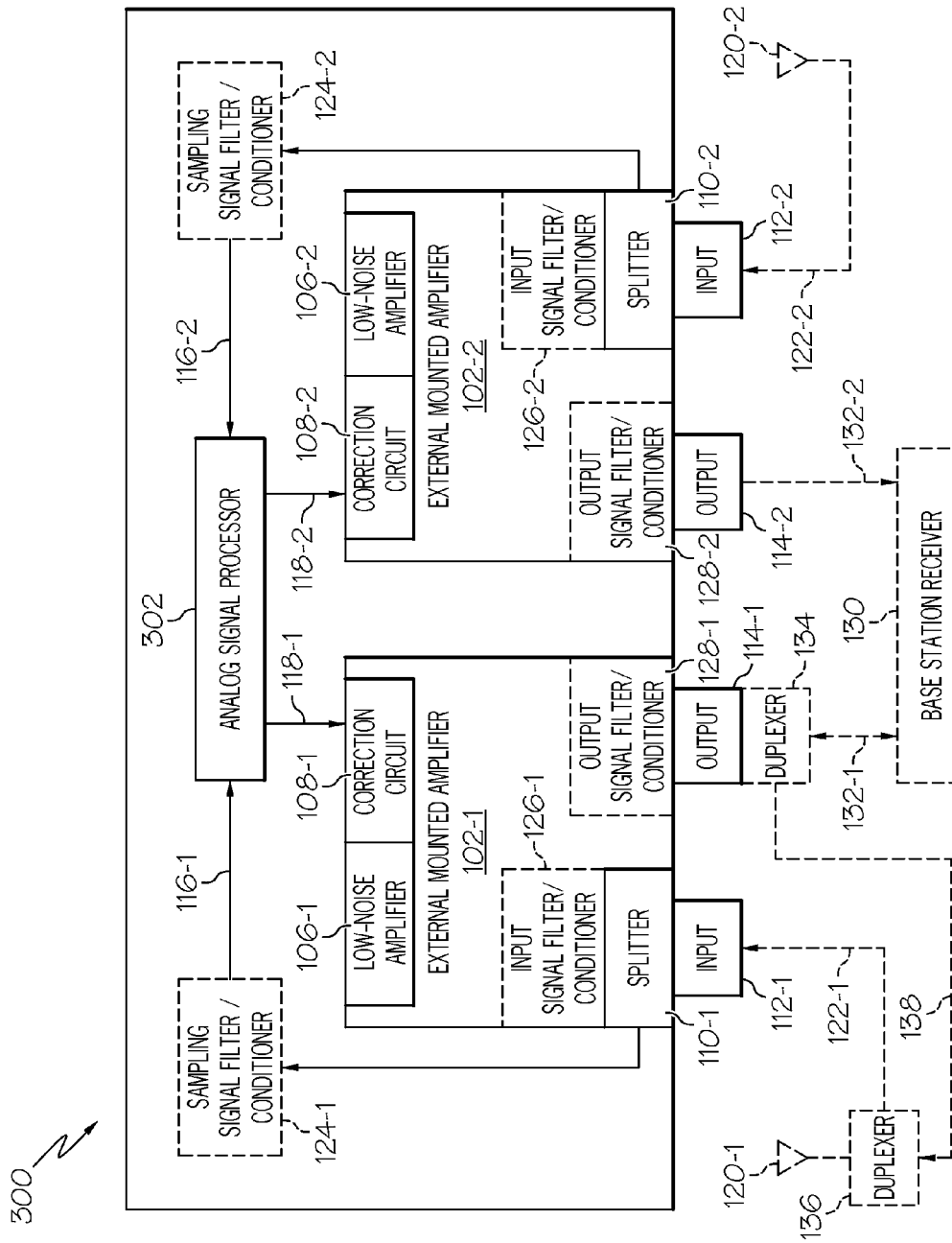
FIG. 3 is a block diagram of another embodiment of an interference canceling dual low-noise amplifier system having an analog signal processor element.

FIG. 3 is a block diagram of one embodiment of an interference canceling dual low-noise amplifier system 300. The system 300 includes the first tower mounted amplifier (EMA) 102-1, the second tower mounted amplifier (EMA) 102-2, and an analog signal processor (ASP) 302. While the ASP 302 is used to implement some of the functionality of system 300, other exemplary embodiments utilize discrete component or other programmable computing systems to implement the same functionality. Other than usage of the ASP 302 instead of the DSP 104, the system 300 has the same components and functionality as the system 100 of FIG. 1 as described above. Some example embodiments of system 300 also include additional optional components, such as first sampling signal filter/conditioner 124-1, second sampling signal filter/conditioner 124-2, first input signal filter/conditioner 126-1, second input signal filter/conditioner 126-2, first output signal filter/conditioner 128-1, second output signal filter/conditioner 128-2, base station receiver 130, duplexer 134, duplexer 136, etc. These and the other elements that are in common between system 100 and system 300 have the same functionality described above with reference to FIG. 1. The first signal and the second signal received in the system 100 are typically RF signals, though other types of signals are used in some embodiments.

As described below, embodiments of the ASP 302 in combination with at least one LNA 106 and other components in the system 300 are operable to adjust the phase of the digitized first sampling signal and the digitized second sampling signal, along with the gain, attenuation, and filtering of various signals, including the first input signal, the first cancelation signal, the first output signal, the second input signal, the second cancelation signal, and the second output signal. By adjusting the phase of the cancelation signals and the gain, attenuation, and filtering of the various signals, the ASP 302 in combination with at least one LNA 106 can effectively reduce noise and interference from an output signal that was present in an input signal received at least one antenna 120.

In some example embodiments, ASP 302 controls the amount of phase shift introduced by the phase shifters and the amount of amplification, attenuation, and filtering applied to the various signals described below. In some example embodiments, the ASP 302 includes a processor as described below to adjust the amount of phase shift, amplification, attenuation, and filtering of the various signals. In some example embodiments, LNA 106-1 and LNA 106-2 control the amount of amplification, attenuation, and filtering applied to the various signals described below in addition to the manner of mixing the input signals with the cancelation signals as described below. In some example embodiments, LNA 106-1 and LNA 106-2 each include a processor as described below to adjust the amount of amplification, attenuation, and filtering of the various signals. While the embodiments below describe phase shift, amplification, attenuation, filtering, etc. generally occurring in ASP 302, LNA 106-1, and LNA 106-2, in some example embodiments the EMA 102-1 and EMA 102-2 include processors (outside of LNA 106-1 and LNA 106-2) to adjust the amount of amplification, attenuation, and filtering of various signals.

FIGS. 4A-4H are functional block diagrams of embodiment of the analog signal processor (ASP) 302. Each of FIGS. 4A-4H shows a different embodiment of ASP 302. The various embodiments are labeled ASP 302A through ASP 302H.

Figure 4A:
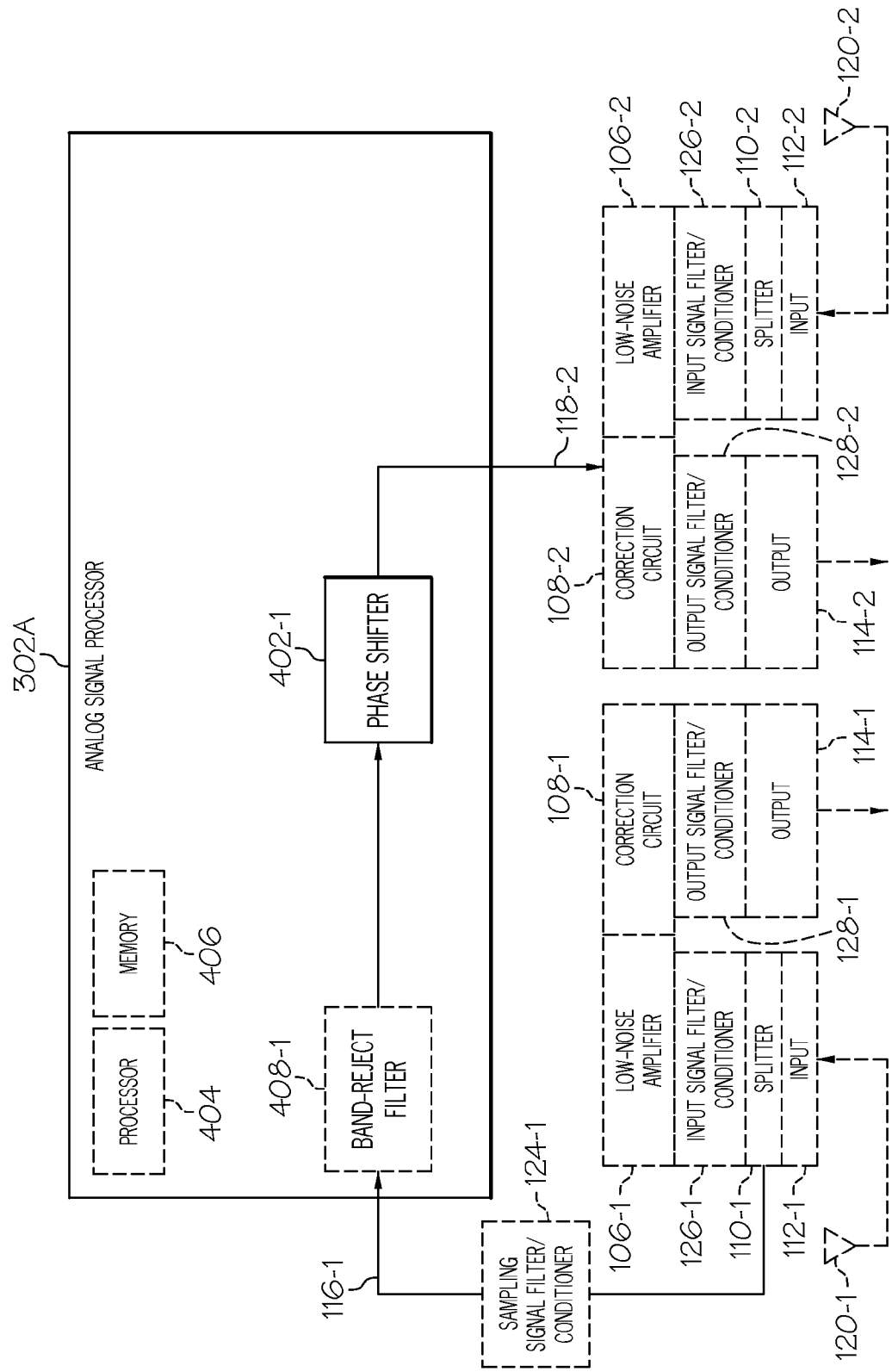
FIGS. 4A-4H are functional block diagrams of embodiments of an analog signal processor element of the system of FIG. 3.

FIG. 4A shows one exemplary embodiment of the ASP 302, labeled ASP 302A. The ASP 302A includes a first phase shifter 402-1. The first phase shifter 402-1 receives the analog first sampling signal and shifts the phase of the analog first sampling signal to create the second cancelation signal that is output to the second LNA 106-2 across the second cancelation signal line 118-2. In some example embodiments, the first phase shifter 402-1 is an inverter that shifts the first sampling signal by 180 degrees. In other example embodiments, the phase shift applied by the first phase shifter 402-1 can be adjusted based on timing, temperature changes, and other variables to create the second cancelation signal that will reduce and/or cancel the noise and interference present in the second signal. In some example embodiments, the entire first sampling signal is shifted. In other example embodiments, only specific bands of the first sampling signal where noise and interference are most likely present are shifted. The second cancelation signal is output to the second LNA 106-2 across the second cancelation signal line 118-2.

In some example embodiments, ASP 302A also includes a processor 404 that is operable to control the amount of phase shift applied to the first sampling signal by the phase shifter 402-1. In some example embodiments, phase shifter 402-1 is adjusted based on preset variables programmed into a memory 406 by a user. These variables can be changed by a user via an interface with the ASP 302A. In some embodiments, these variables indicate the desired amount of phase shift. In some embodiments, the variables also indicate a band in which the phase shift should occur. In some example embodiments of ASP 302A, an optional first band-reject filter 408-1 is used to isolate the noise and interference present in the first sampling signal for analog processing by the ASP 302A.

Figure 4B:
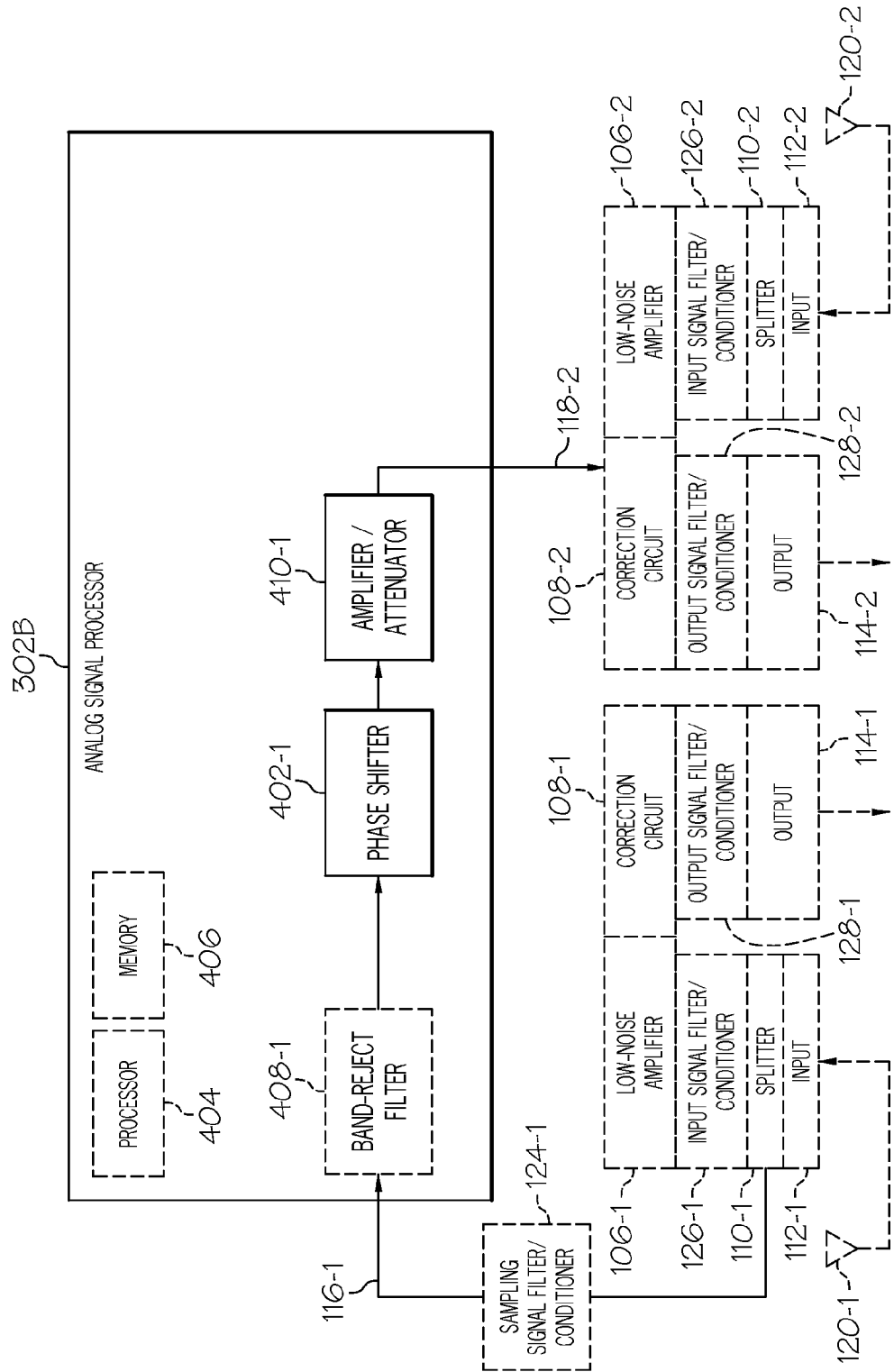

FIG. 4B shows another exemplary embodiment of the ASP 302, labeled ASP 302B. The ASP 302B includes all the same components as ASP 302A discussed above, which operate according to the description above. Additionally, ASP 302B includes an amplifier/attenuator 410-1. The second cancelation signal is either amplified or attenuated by the amplifier/attenuator 410-1 and output to the second LNA 106-2 across the second cancelation signal line 118-2. The second cancelation signal is amplified or attenuated so that it is at an appropriate amplification to reduce and/or cancel the effects of noise and interference present in the second signal. In some example embodiments, the amplifier/attenuator 410-1 is an amplifier, an attenuator, or both an amplifier and an attenuator. In some example embodiments, alternative signal level adjustment devices are used instead of an amplifier and/or an attenuator.

In some example embodiments, ASP 302B also includes the processor 404 that is operable to control the amount of phase shift applied to the first sampling signal by the phase shifter 402-1 and/or the amount of amplification/attenuation applied by amplifier/attenuator 410-1. In some example embodiments, phase shifter 402-1 and amplifier/attenuator 410-1 are adjusted based on preset variables programmed into a memory 406 by a user. These variables can be changed by a user via an interface with the ASP 302B. In some embodiments, these variables indicate the desired amount of phase shift and/or amplification/attenuation. In some embodiments, the variables also indicate a band in which the phase shift should occur. In some example embodiments, the entire first sampling signal is shifted. In some example embodiments, ASP 302B selectively performs the phase shift only on signals in a noise band of interest where the noise and interference are present, whereby creating a second cancelation signal that only removes noise from the noise band of interest. In some example embodiments of ASP 302B, the optional first band-reject filter 408-1 is used to isolate the noise and interference present in the first sampling signal for analog processing by the ASP 302B.

Figure 4C:
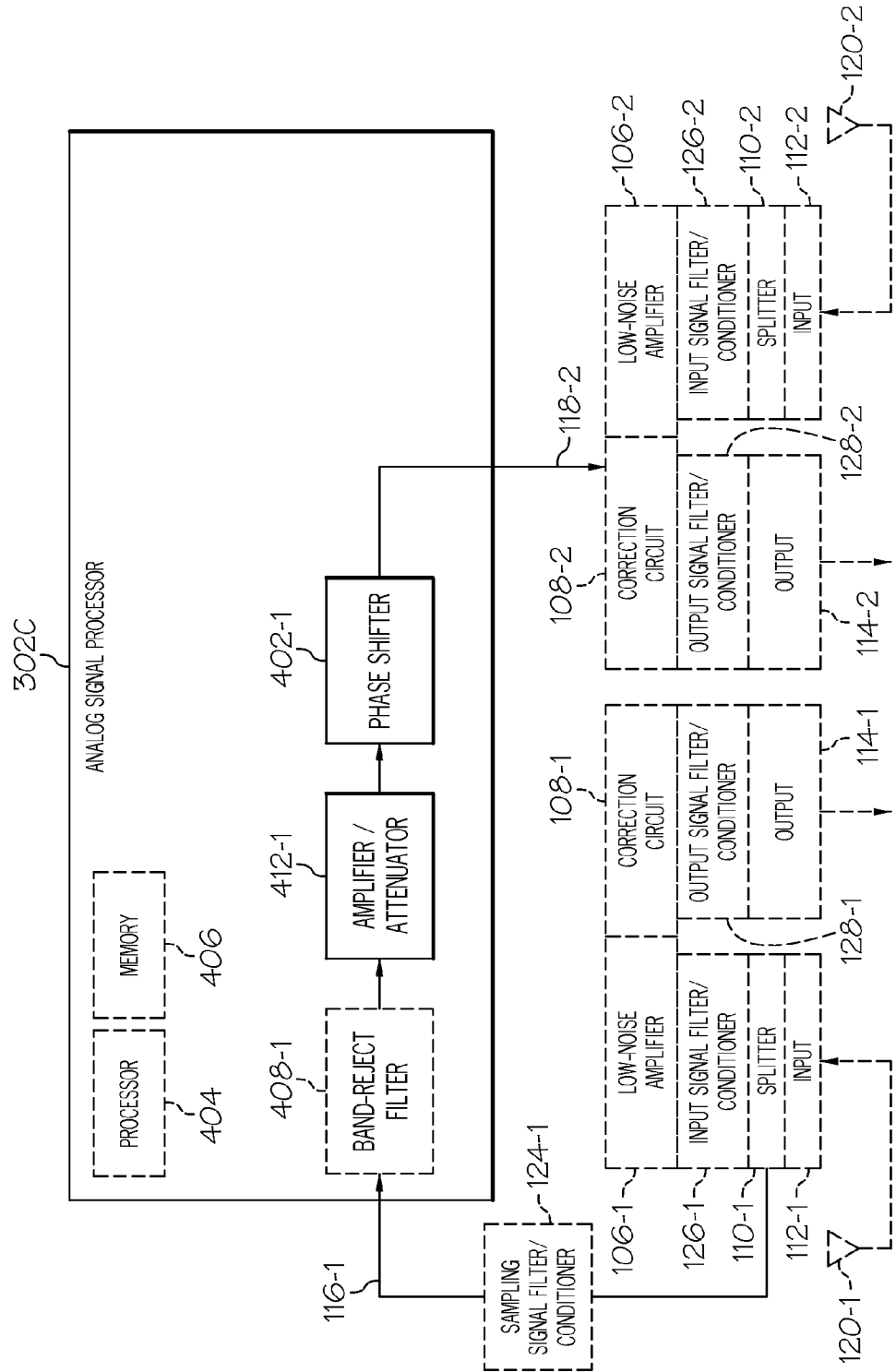

FIG. 4C shows another exemplary embodiment of the ASP 302, labeled ASP 302C. The ASP 302B includes all the same components as ASP 302A discussed above, which operate according to the description above. Additionally, ASP 302C includes an amplifier/attenuator 412-1. The first sampling signal is either amplified or attenuated by the amplifier/attenuator 412-1 so that it is at an appropriate amplification for the subsequent phase shift and eventual cancelation of the effects of noise and interference present in the second signal. In some example embodiments, the amplifier/attenuator 412-1 is an amplifier, an attenuator, or both an amplifier and an attenuator. In some example embodiments, alternative signal level adjustment devices are used instead of an amplifier and/or an attenuator.

In some example embodiments, ASP 302C also includes the processor 404 that is operable to control the amount of phase shift applied to the first sampling signal by the phase shifter 402-1 and/or the amount of amplification/attenuation applied by amplifier/attenuator 412-1. In some example embodiments, phase shifter 402-1 and amplifier/attenuator 412-1 are adjusted based on preset variables programmed into the memory 406 by a user. These variables can be changed by a user via an interface with the ASP 302C. In some embodiments, these variables indicate the desired amount of phase shift and/or amplification/attenuation. In some embodiments, the variables also indicate a band in which the phase shift should occur. In some example embodiments, the entire first sampling signal is shifted. In some example embodiments, ASP 302C selectively performs the phase shift only on signals in a noise band of interest where the noise and interference are present, whereby creating a second cancelation signal that only removes noise from the noise band of interest. In some example embodiments of ASP 302C, the optional first band-reject filter 408-1 is used to isolate the noise and interference present in the first sampling signal for analog processing by the ASP 302C.

Figure 4D:
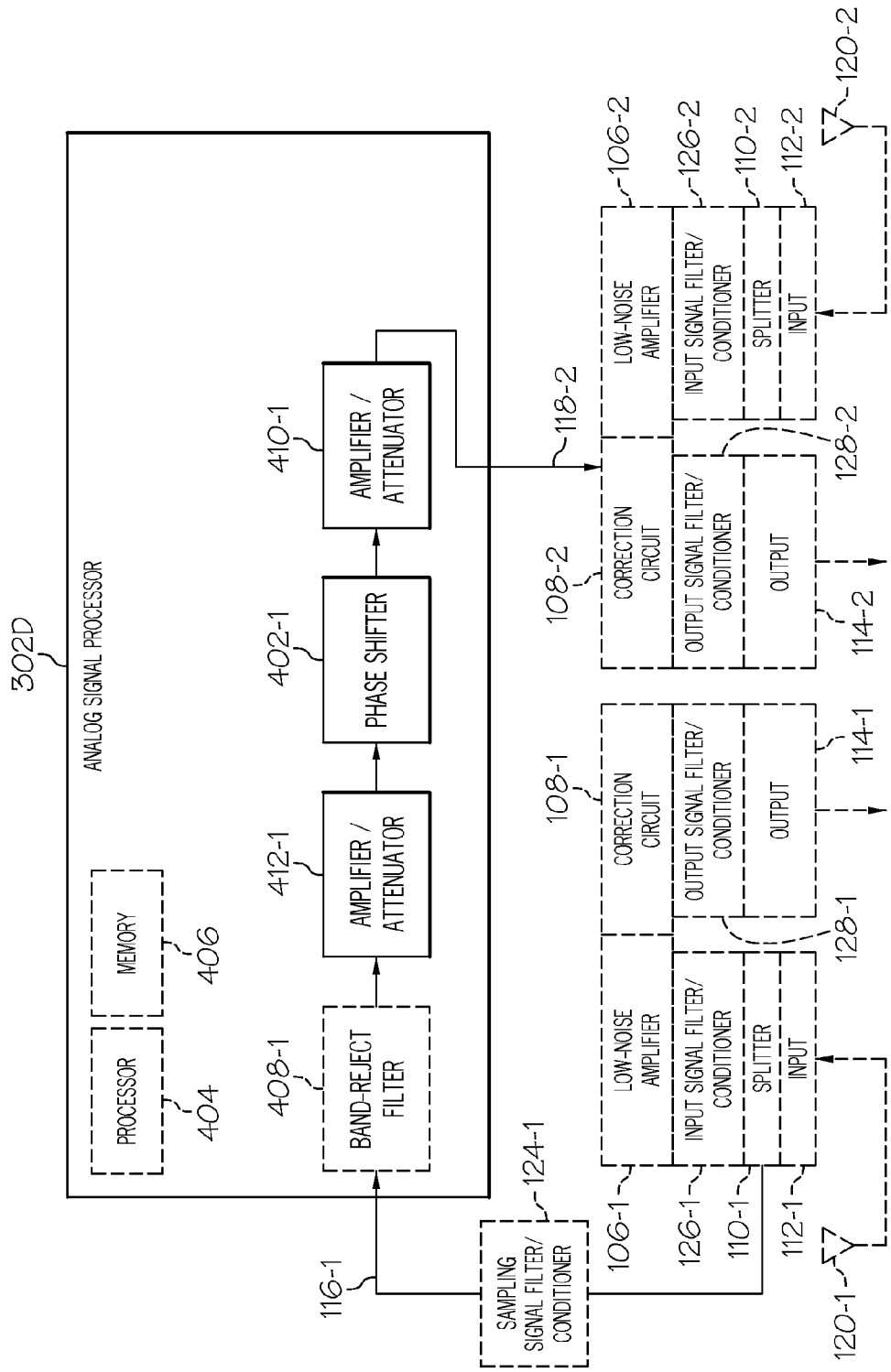

FIG. 4D shows another exemplary embodiment of the ASP 302, labeled ASP 302D. The ASP 302D includes all the same components as ASP 302A discussed above, which operate according to the description above. Additionally, ASP 302D includes the amplifier/attenuator 410-1 and the amplifier/attenuator 412-1 described with reference to FIG. 4B and FIG. 4C respectively. Both of these amplifier/attenuators operate according to their descriptions above. As noted above, in some embodiments, processor 404 is operable to control the amount of phase shift applied to the first sampling signal by the phase shifter 402-1 and/or the amount of amplification and/or attenuation provided by the amplifier/attenuators 410-1 and 412-1. In some of these embodiments, phase shifter 402-1, amplifier/attenuator 410-1, and/or amplifier/attenuator 412-1 are adjusted based on preset variables programmed into the memory 406 by a user. These variables can be changed by a user via an interface with the ASP 302D. In some embodiments, these variables indicate the desired amount of phase shift and/or amplification/attenuation. In some embodiments, the variables also indicate a band in which the phase shift should occur. In some example embodiments, the entire first sampling signal is shifted. In some example embodiments, ASP 302D selectively performs the phase shift only on signals in a noise band of interest where the noise and interference are present, whereby creating a second cancelation signal that only removes noise from the noise band of interest. In some example embodiments of ASP 302D, the optional first band-reject filter 408-1 is used to isolate the noise and interference present in the first sampling signal for analog processing by the ASP 302D.

Figure 4E:
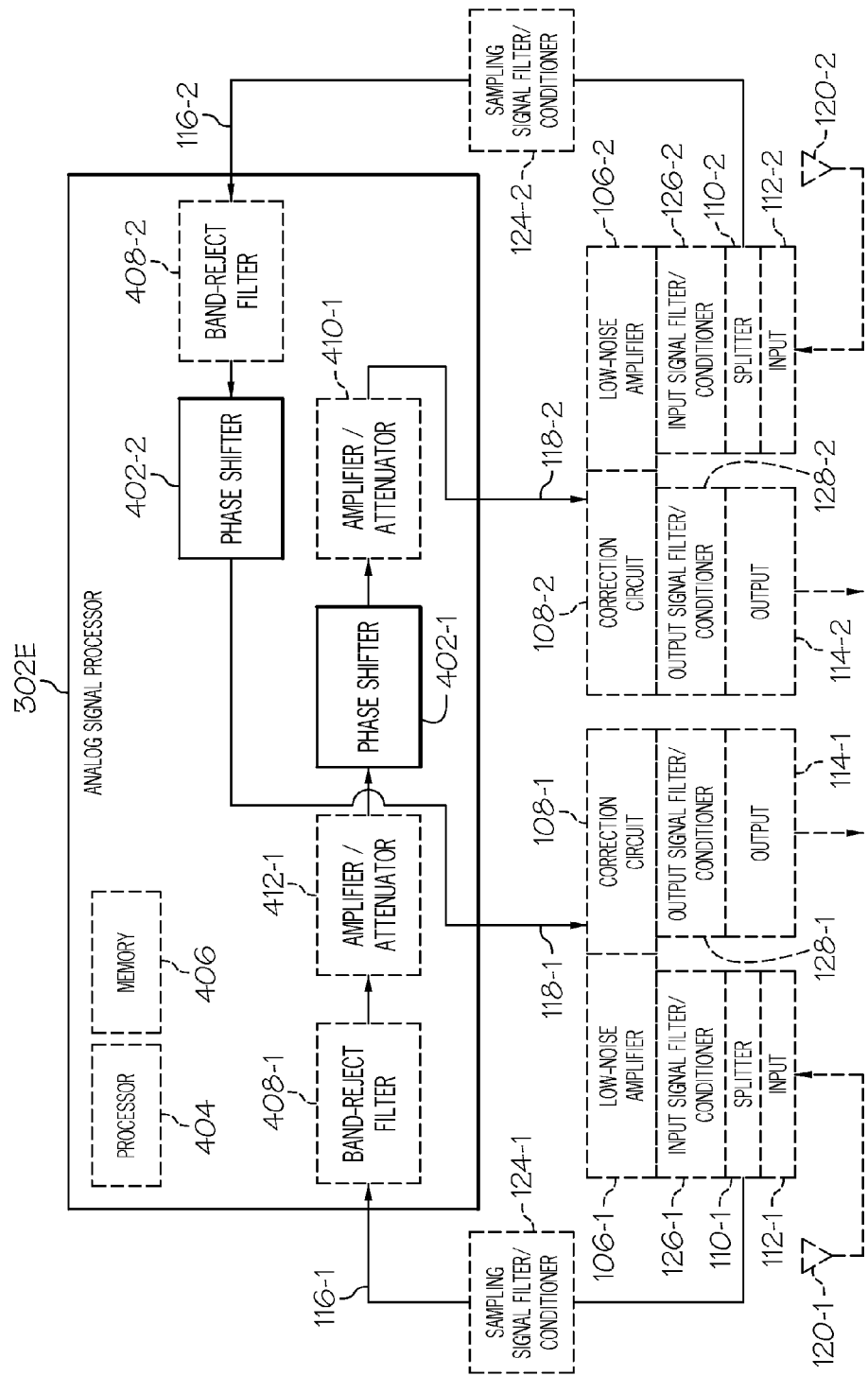

FIG. 4E shows another exemplary embodiment of the ASP 302, labeled ASP 302E. The ASP 302E includes a second phase shifter 402-2 in addition to the first phase shifter 402-1. The first phase shifter 402-1 operates according to the description of ASP 302A-302D shown in FIGS. 4A-4D and described above. The second phase shifter 402-2 receives the analog second sampling signal and shifts the phase of the analog second sampling signal to create the first cancelation signal that is output to the first LNA 106-1 across the first cancelation signal line 118-1. In some example embodiments, the second phase shifter 402-2 is an inverter that shifts the second sampling signal by 180 degrees. In other example embodiments, the second phase shifter 402-2 adjusts the amount of phase shift applied to the second sampling signal based on timing, temperature changes, and other variables to create the first cancelation signal that will most effectively cancel out the noise and interference present in the second signal. In some example embodiments, the entire second sampling signal is shifted. In other example embodiments, only specific bands of the second sampling signal where noise and interference are most likely present are shifted. The first cancelation signal is output to the first LNA 106-1 across the first cancelation signal line 118-1.

In some example embodiments, ASP 302E also includes the processor 404 that is operable to control the amount of phase shift applied to the second sampling signal by the phase shifter 402-2. In some of these embodiments, the processor 404 implements preset variables programmed into the memory 406 to control the phase shift and amplification and/or attenuation applied to the second sampling signal and/or the first cancelation signal. In some example embodiments, ASP 302E selectively performs the phase shift only on signals in a noise band of interest having the noise and interference, creating a first cancelation signal that only removes noise from the noise band of interest. In some example embodiments of ASP 302E, an optional second band-reject filter 408-2 is used to isolate the noise and interference present in the first signal for analog processing by the ASP 302E.

In some example embodiments, the ASP 302E also includes additional optional components, such as the component amplifier/attenuator 410-1, the amplifier/attenuator 412-1, and the first band-reject filter 408-1. These optional components also operate according to the description of ASP 302A-302D shown in FIGS. 4A-4D and described above. In some example embodiments of ASP 302E, an optional first band-reject filter 408-1 is used to isolate the noise and interference present in the second signal for analog processing by the ASP 302E.

Figure 4F:
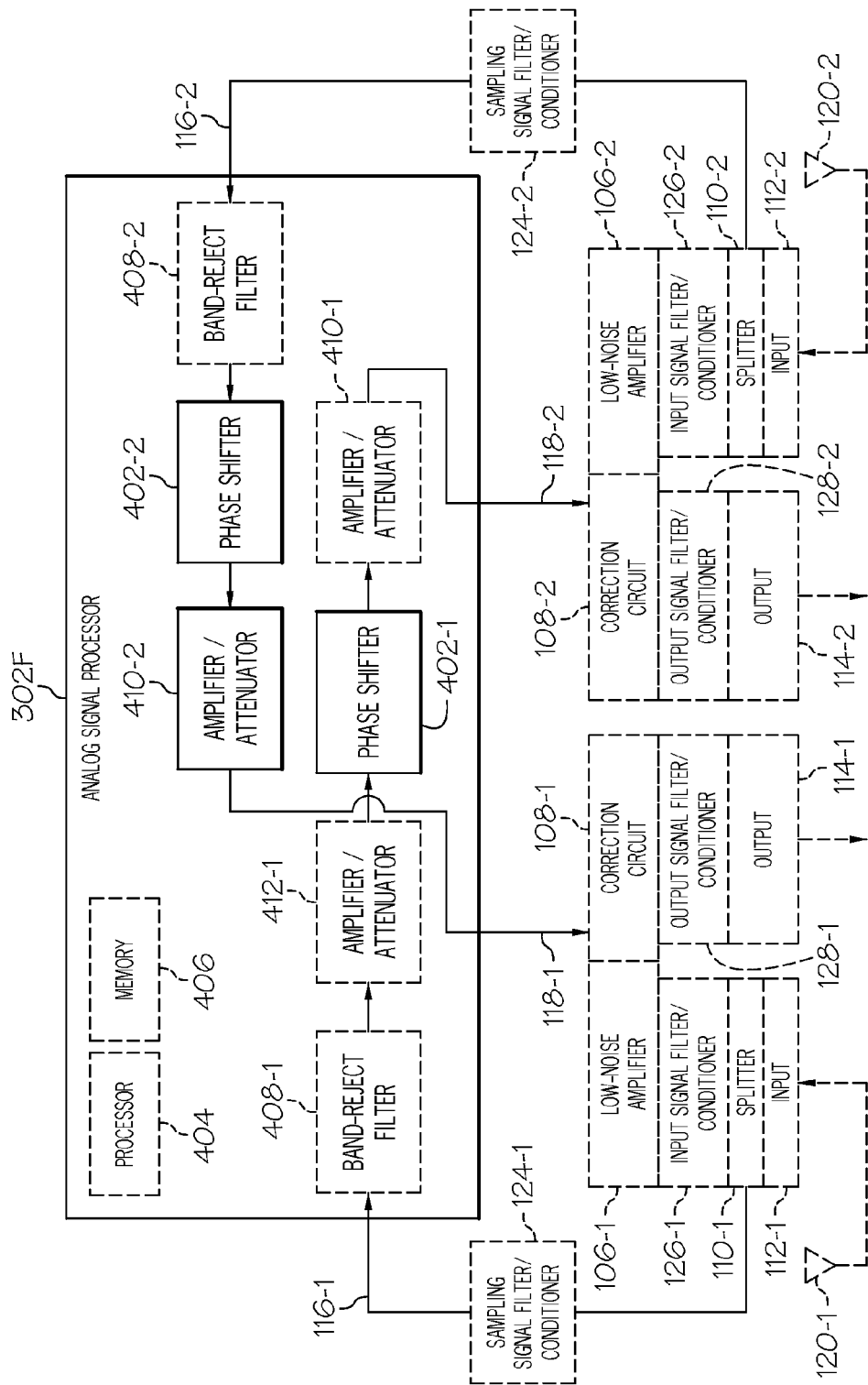

FIG. 4F shows another exemplary embodiment of the ASP 302, labeled ASP 302F. The ASP 302F includes all the same components as ASP 302E discussed above, which operate according to the description above. Additionally, ASP 302B includes an amplifier/attenuator 410-2. The first cancelation signal is either amplified or attenuated by the amplifier/attenuator 410-2 and output to the first LNA 106-1 across the first cancelation signal line 118-1. The first cancelation signal is amplified or attenuated so that it is at the appropriate amplification to reduce and/or cancel the effects of noise and interference present in the first signal. In some example embodiments, the amplifier/attenuator 410-2 is an amplifier, an attenuator, or both an amplifier and an attenuator. In some example embodiments, alternative signal level adjustment devices are used instead of an amplifier and/or an attenuator.

In some example embodiments, ASP 302F also includes the processor 404 that is operable to control the amount of phase shift applied to the second sampling signal by the phase shifter 402-2 and/or the amount of amplification/attenuation applied by amplifier/attenuator 410-2. In some example embodiments, phase shifter 402-2 and amplifier/attenuator 410-2 are adjusted based on preset variables programmed into the memory 406 by a user. These variables can be changed by a user via an interface with the ASP 302F. In some embodiments, these variables indicate the desired amount of phase shift and/or amplification/attenuation. In some embodiments, the variables also indicate a band in which the phase shift should occur. In some example embodiments, the entire first sampling signal is shifted. In some example embodiments, ASP 302F selectively performs the phase shift only on signals in a noise band of interest where the noise and interference are present, whereby creating a first cancelation signal that only removes noise from the noise band of interest. In some example embodiments of ASP 302F, the optional second band-reject filter 408-2 is used to isolate the noise and interference present in the second sampling signal for analog processing by the ASP 302F.

Figure 4G:
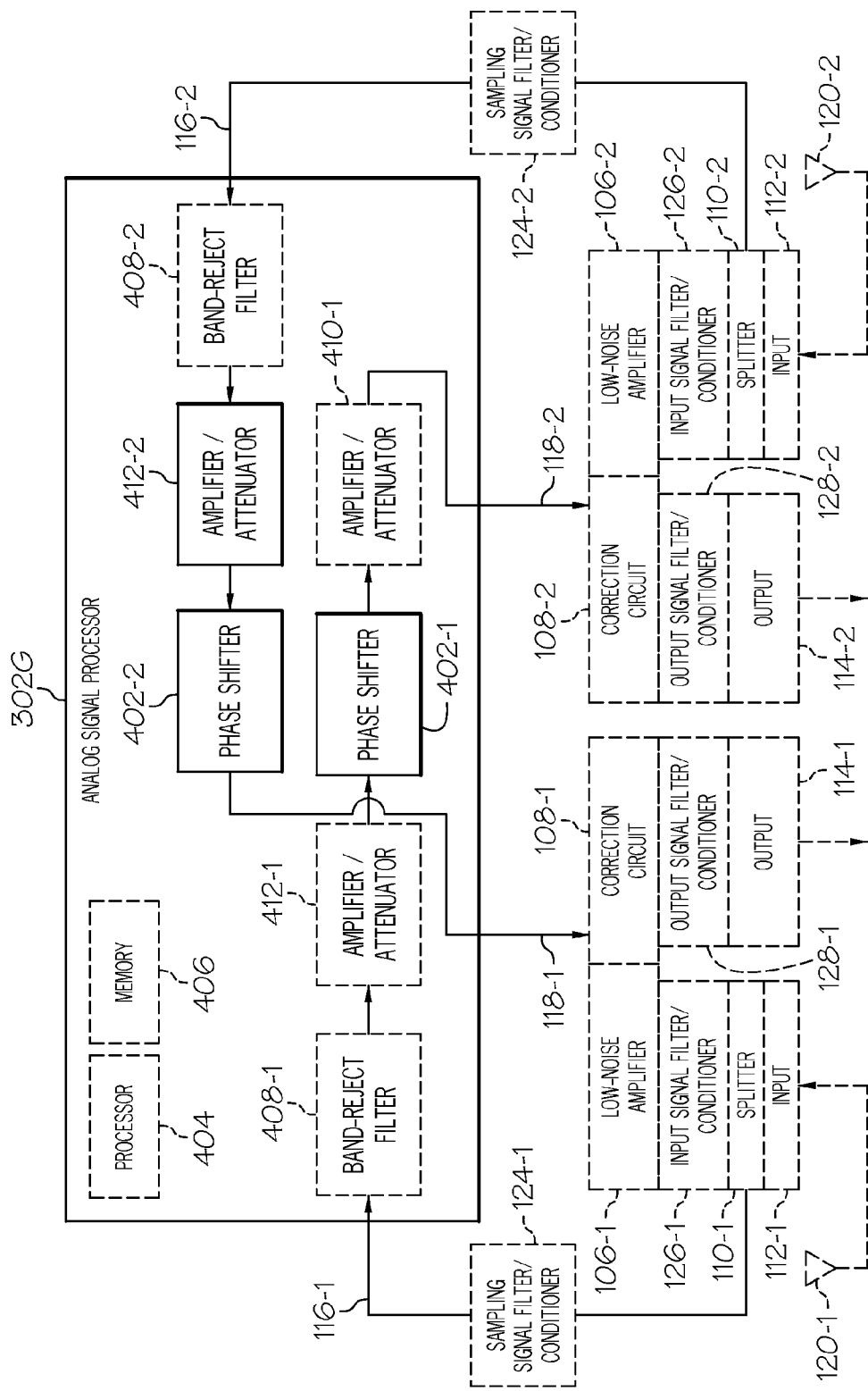

FIG. 4G shows another exemplary embodiment of the ASP 302, labeled ASP 302G. The ASP 302G includes all the same components as ASP 302E discussed above, which operate according to the description above. Additionally, ASP 302G includes an amplifier/attenuator 412-2. The second sampling signal is either amplified or attenuated by the amplifier/attenuator 412-2 so that it is at an appropriate amplification for the subsequent phase shift and eventual cancelation of the effects of noise and interference present in the first signal. In some example embodiments, the amplifier/attenuator 412-2 is an amplifier, an attenuator, or both an amplifier and an attenuator. In some example embodiments, alternative signal level adjustment devices are used instead of an amplifier and/or an attenuator.

In some example embodiments, ASP 302G also includes the processor 404 that is operable to control the amount of phase shift applied to the second sampling signal by the phase shifter 402-2 and/or the amount of amplification/attenuation applied by amplifier/attenuator 212-2. In some example embodiments, phase shifter 402-2 and amplifier/attenuator 412-2 are adjusted based on preset variables programmed into the memory 406 by a user. These variables can be changed by a user via an interface with the ASP 302G. In some embodiments, these variables indicate the desired amount of phase shift and/or amplification/attenuation. In some embodiments, the variables also indicate a band in which the phase shift should occur. In some example embodiments, the entire first sampling signal is shifted. In some example embodiments, ASP 302G selectively performs the phase shift only on signals in a noise band of interest where the noise and interference are present, whereby creating a first cancelation signal that only removes noise from the noise band of interest. In some example embodiments of ASP 302G, the optional second band-reject filter 408-2 is used to isolate the noise and interference present in the second sampling signal for analog processing by the ASP 302G.

Figure 4H:
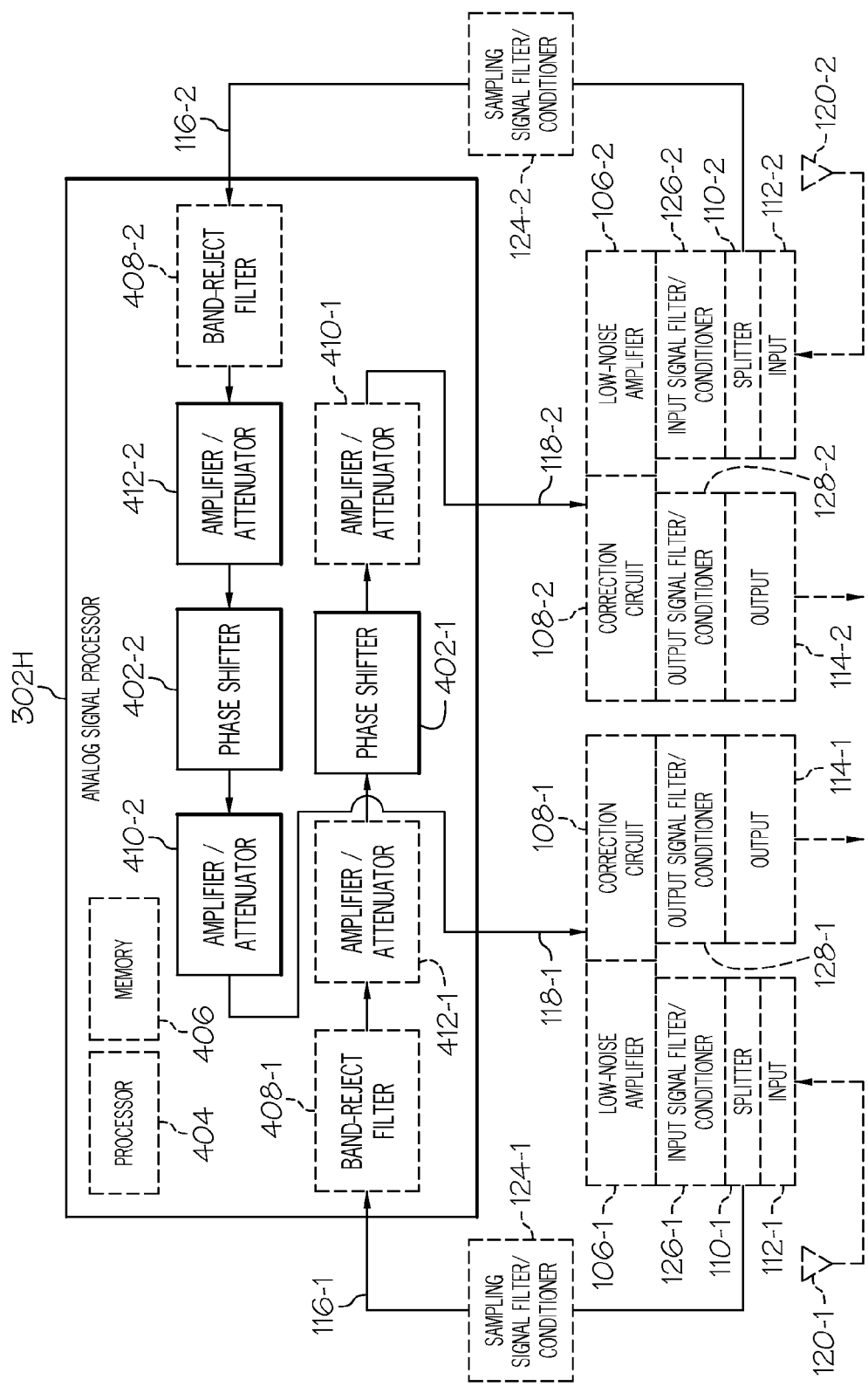

FIG. 4H shows another exemplary embodiment of the ASP 302, labeled ASP 302H. The ASP 302H includes all the same components as ASP 302E discussed above, which operate according to the description above. Additionally, ASP 302H includes the amplifier/attenuator 410-2 and the amplifier/attenuator 412-2 described with reference to FIG. 4F and FIG. 4G respectively. Both of these amplifier/attenuators operate according to their descriptions above. As noted above, in some embodiments, processor 404 is operable to control the amount of phase shift applied to the first sampling signal by the phase shifter 402-2 and/or the amount of amplification and/or attenuation provided by the amplifier/attenuators 410-2 and 412-2. In some of these embodiments, phase shifter 402-2, amplifier/attenuator 410-2, and/or amplifier/attenuator 412-2 are adjusted based on preset variables programmed into the memory 406 by a user. These variables can be changed by a user via an interface with the ASP 302H. In some embodiments, these variables indicate the desired amount of phase shift and/or amplification/attenuation. In some embodiments, the variables also indicate a band in which the phase shift should occur. In some example embodiments, the entire second sampling signal is shifted. In some example embodiments, ASP 302H selectively performs the phase shift only on signals in a noise band of interest where the noise and interference are present, whereby creating a first cancelation signal that only removes noise from the noise band of interest. In some example embodiments of ASP 302H, the optional second band-reject filter 408-2 is used to isolate the noise and interference present in the second sampling signal for analog processing by the ASP 302H.

FIGS. 5A-5G are functional block diagrams of embodiments of a low-noise amplifier (LNA), such as LNA 106-1 or LNA 106-2. Each of FIGS. 5A-5G shows a different embodiment of an LNA. The various embodiments are labeled LNA 106A through LNA 106E. While the embodiments of FIGS. 5A-5G describe cancelation signals derived by the DSP 104 according to FIGS. 2A-2H, in other example embodiments the cancelation signals are derived from the ASP 302 according to FIGS. 4A-4H. FIGS. 5A-5G and the description below explicitly describe how a first LNA 106, such as LNA 106-1, uses a cancelation signal derived from a first signal received at a first antenna to cancel the effects of noise and interference from a second signal received at a second antenna. While the reference numbers describe this first scenario, the same figures and description teach how a second LNA 106, such as LNA 106-2, uses a cancelation signal derived from a second signal received at a second antenna to cancel the effects of noise and interference from a first signal received at a first antenna.

Figure 5A:
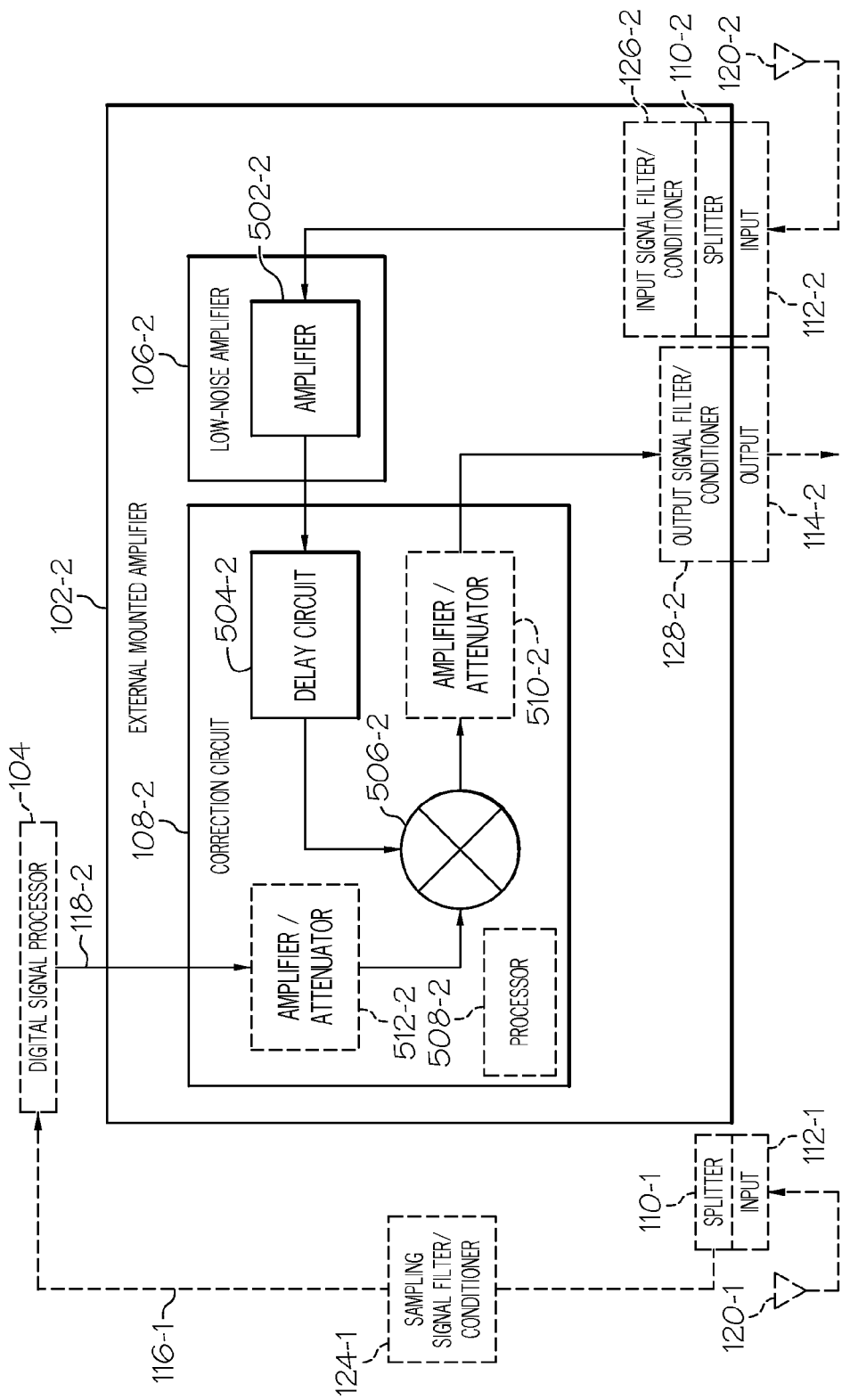
FIGS. 5A-5B are functional block diagrams of embodiments of a low-noise amplifier element of the system of FIG. 1.

FIG. 5A shows one exemplary embodiment of the EMA 102-2. As discussed above, the EMA 102-2 includes low-noise amplifier 106-2 and correction circuit 108-2, along with splitter 110-2, input 112-2, output 114-2, input signal filter/conditioner 126-2, and output signal filter/conditioner 128-2. Low-noise amplifier 106-2 includes an amplifier 502-2. Amplifier 502-2 receives the input signal from the splitter 110-2 (via the input signal filter/conditioner 126-2 in some embodiments). Amplifier 502-2 amplifies the input signal and outputs the amplified input signal to correction circuit 108-2. Correction circuit 108-2 includes a delay circuit 504-2 and a mixer 506-2. In some embodiments, the delay circuit 504-2 is a delay line or a delay filter.

The delay circuit delays the amplified input signal by an amount equal to the difference in the intrinsic delay of the path of the second cancelation signal (including the intrinsic delay between splitter 110-1 and the second cancelation signal reaching the mixer 506-2) and the intrinsic delay of the path of the second input signal (including the intrinsic delay between splitter 110-2 and the second input signal reaching the delay circuit 504-2). This delay circuit delays the second input signal appropriately, so that the phase shifted second cancelation signal generated by the digital signal processor will be accurately aligned with the interference present in the second input signal. Subsequently, mixer 506-2 mixes the amplified and delayed second input signal with the second cancelation signal to generate a second output signal. In other embodiments, the delay circuit 504-2 is not necessary because the delay between the two relevant paths is negligible.

In some example embodiments, correction circuit 108-2 also includes a processor 508-2 that controls the mixing at mixer 506-2 and other components of the correction circuit. In addition, some example embodiments also include optional amplifier/attenuator 510-2 and option amplifier/attenuator 512-2. Optional amplifier/attenuator 510-2 amplifies and/or attenuates the second output signal and optional amplifier/attenuator 512-2 amplifies and/or attenuates the second cancelation signal before it is mixed with the amplified and delayed first input signal. In embodiments having amplifier/attenuator 510-2 or 512-2, the amplification and/or attenuation of the second output or second cancelation signals by amplifier/attenuators 510-2 and 512-2 can be controlled by processor 508-2. While a single input signal filter/conditioner 126-2 is described and shown in FIG. 5A as an optional component, other example embodiments include additional filter used to filter various signals at various places in EMA 102-2 and the system 100 generally.

Figure 5B:
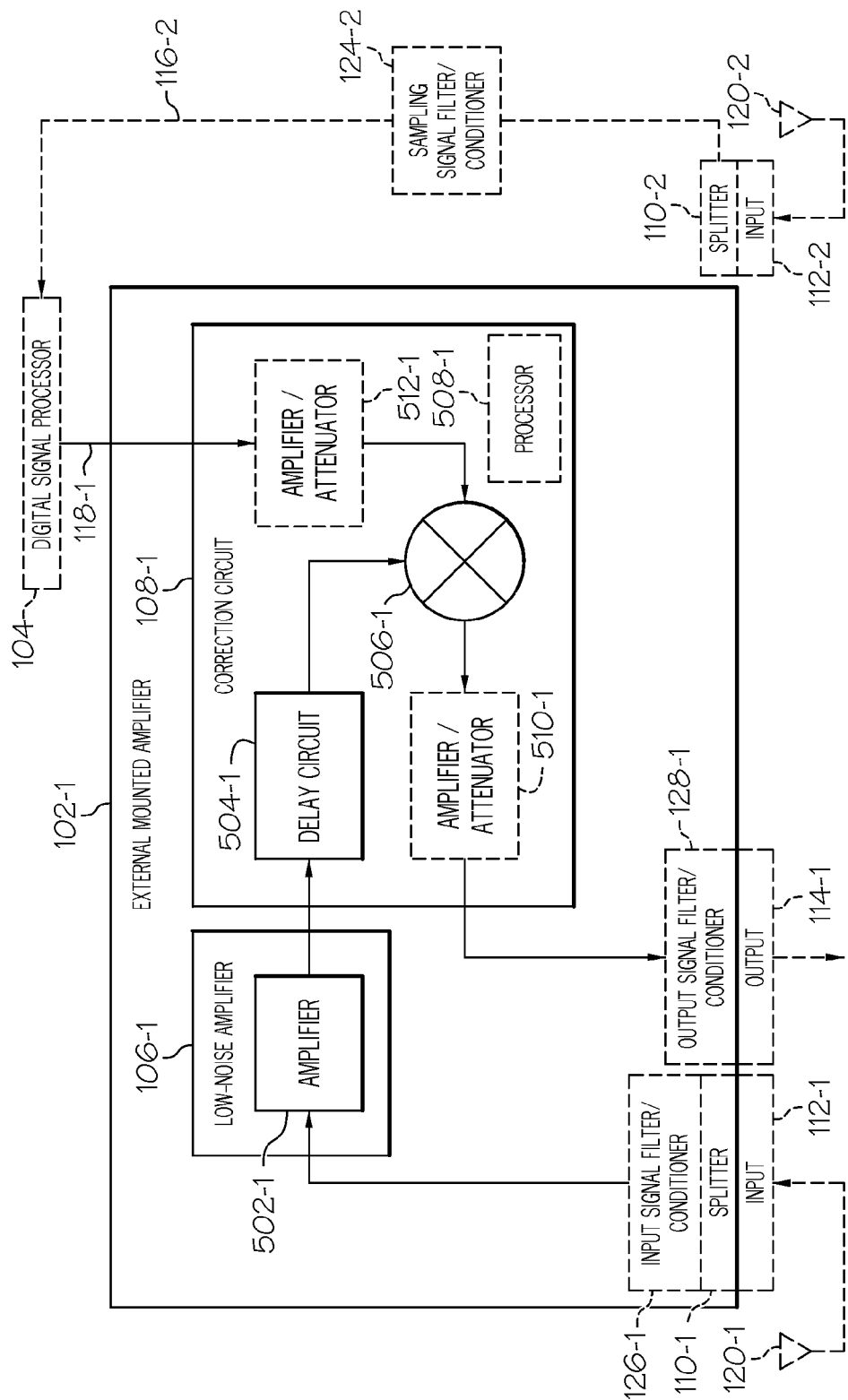

FIG. 5B shows an exemplary embodiment of the EMA 102-1. As discussed above, the EMA 102-1 includes LNA 106-1 and correction circuit 108-1, along with splitter 110-1, input 112-1, output 114-1, input signal filter/conditioner 126-1, and output signal filter/conditioner 128-1. LNA 106-1 includes an amplifier 502-1. Amplifier 502-1 receives the input signal from the splitter 110-1 (via the input signal filter/conditioner 126-1 in some embodiments). Amplifier 502-1 amplifies the input signal and outputs the amplified input signal to correction circuit 108-1. Correction circuit 108-1 includes a delay circuit 504-1 and a mixer 506-1. In some embodiments, the delay circuit 504-1 is a delay line or a delay filter.

The delay circuit delays the amplified input signal by an amount equal to the difference in the intrinsic delay of the path of the second cancelation signal (including the intrinsic delay between splitter 110-2 and the second cancelation signal reaching the mixer 506-1) and the intrinsic delay of the path of the second input signal (including the intrinsic delay between splitter 110-1 and the second input signal reaching the delay circuit 504-1). This delay circuit delays the second input signal appropriately, so that the phase shifted second cancelation signal generated by the digital signal processor will be accurately aligned with the interference present in the second input signal. Subsequently, mixer 506-1 mixes the amplified and delayed second input signal with the second cancelation signal to generate a second output signal. In other embodiments, the delay circuit 504-1 is not necessary because the delay between the two relevant paths is negligible.

In some example embodiments, correction circuit 108-1 also includes a processor 508-1 that controls the mixing at mixer 506-1 and other components of the correction circuit. In addition, some example embodiments also include optional amplifier/attenuator 510-1 and option amplifier/attenuator 512-1. Optional amplifier/attenuator 510-1 amplifies and/or attenuates the second output signal and optional amplifier/attenuator 512-1 amplifies and/or attenuates the second cancelation signal before it is mixed with the amplified and delayed first input signal. In embodiments having amplifier/attenuator 510-1 or 512-1, the amplification and/or attenuation of the output or second cancelation signals by amplifier/attenuators 510-1 and 512-1 can be controlled by processor 508-1. While a single input signal filter/conditioner 126-1 is described and shown in FIG. 5A as an optional component, other example embodiments include additional filter used to filter various signals at various places in EMA 102-1 and the system 100 generally.

Figure 6A:
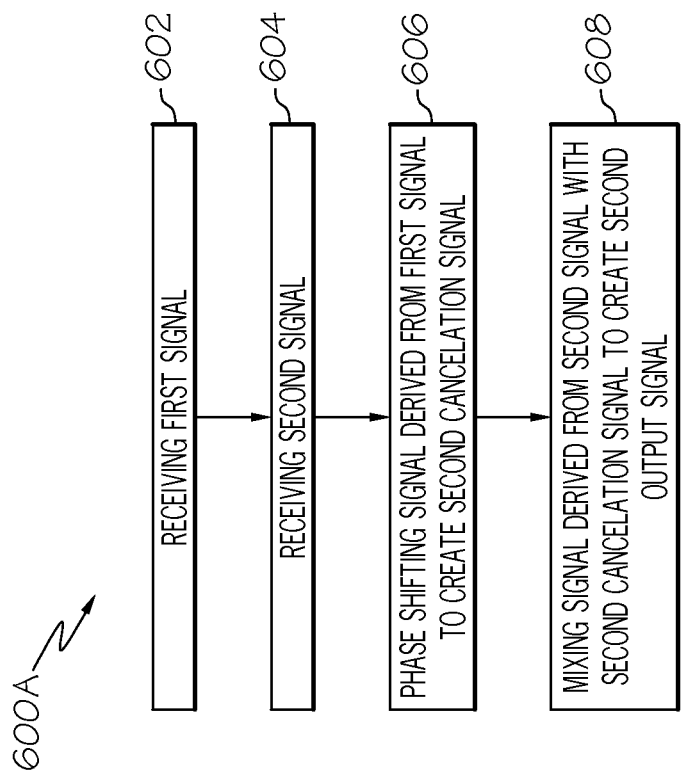
FIGS. 6A-6B are flow diagrams of embodiments of methods of performing interference cancelation generally.
Figure 6B:
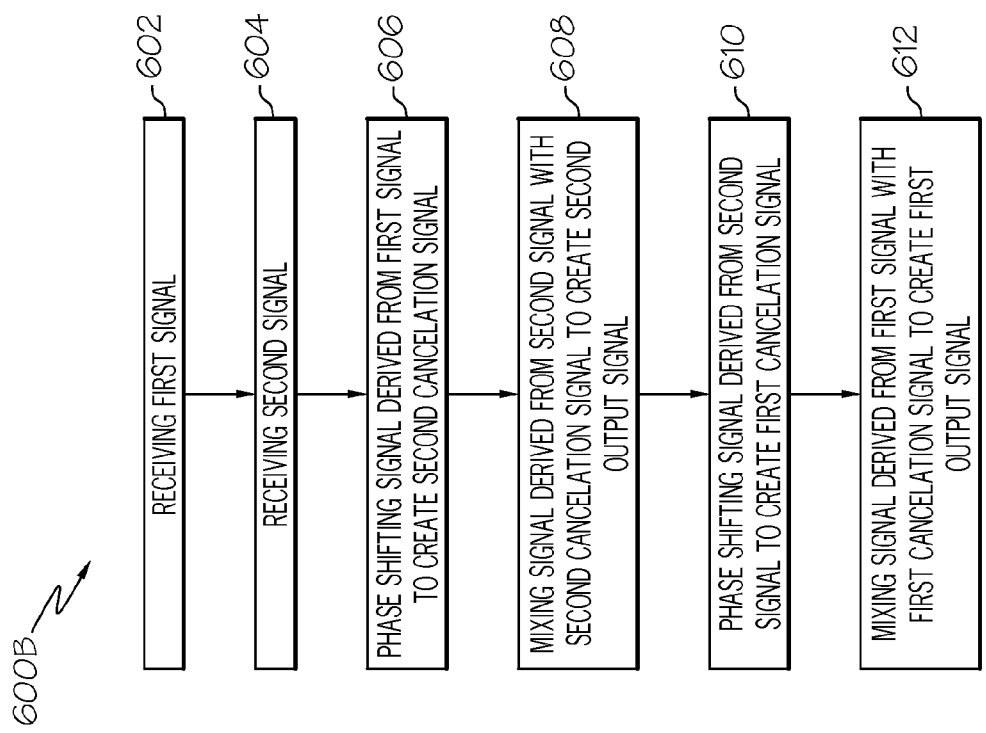

FIGS. 6A-6B are flow diagrams showing embodiments of a method 600 of using the interference canceling dual low-noise amplifier system 100 or the interference canceling dual low-noise amplifier system 300. Each of FIGS. 6A-6B shows a different embodiment of a method 600. The various embodiments of the method are labeled method 600A through method 600B. The methods will be described with reference to the dual low-noise amplifier system 100 of FIG. 1, though the same methods apply with reference to the dual low-noise amplifier system 300 of FIG. 3.

FIG. 6A shows an exemplary embodiment of a method flow diagram, labeled method 600A. The method 600A begins at block 602, where a first signal is received at the system 100. At block 604, a second signal is received at the system 100. At block 606, a signal derived from the first signal is phase shifted to create a second cancelation signal. At block 608, a signal derived from the second signal is mixed with the second cancelation signal to create a second output signal. The elements of method 600A can be performed in a variety of different orders and the ordering shown in method 600A is not intended to be limiting.

FIG. 6B shows an exemplary embodiment of a method flow diagram, labeled method 600B. The method 600B begins at block 602, where a first signal is received at the system 100. At block 604, a second signal is received at the system 100. At block 606, a signal derived from the first signal is phase shifted to create a second cancelation signal. At block 608, a signal derived from the second signal is mixed with the second cancelation signal to create a second output signal. At block 610, a signal derived from the second input signal is phase shifted to create a first cancelation signal. At block 612, a signal derived from the first signal is mixed with the first cancelation signal to create a first output signal. The elements of method 600B can be performed in a variety of different orders and the ordering shown in method 600B is not intended to be limiting.

Figure 7A:
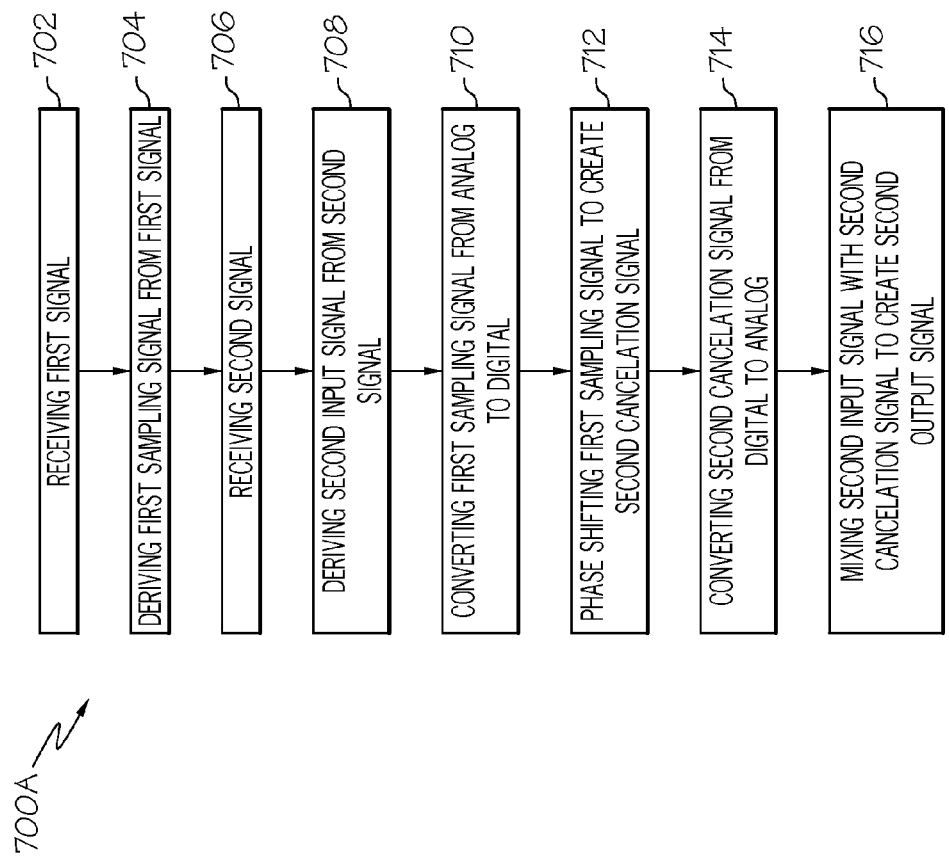
FIGS. 7A-7B are flow diagrams of embodiments of methods of performing interference cancelation using a digital signal processor.
Figure 7B:
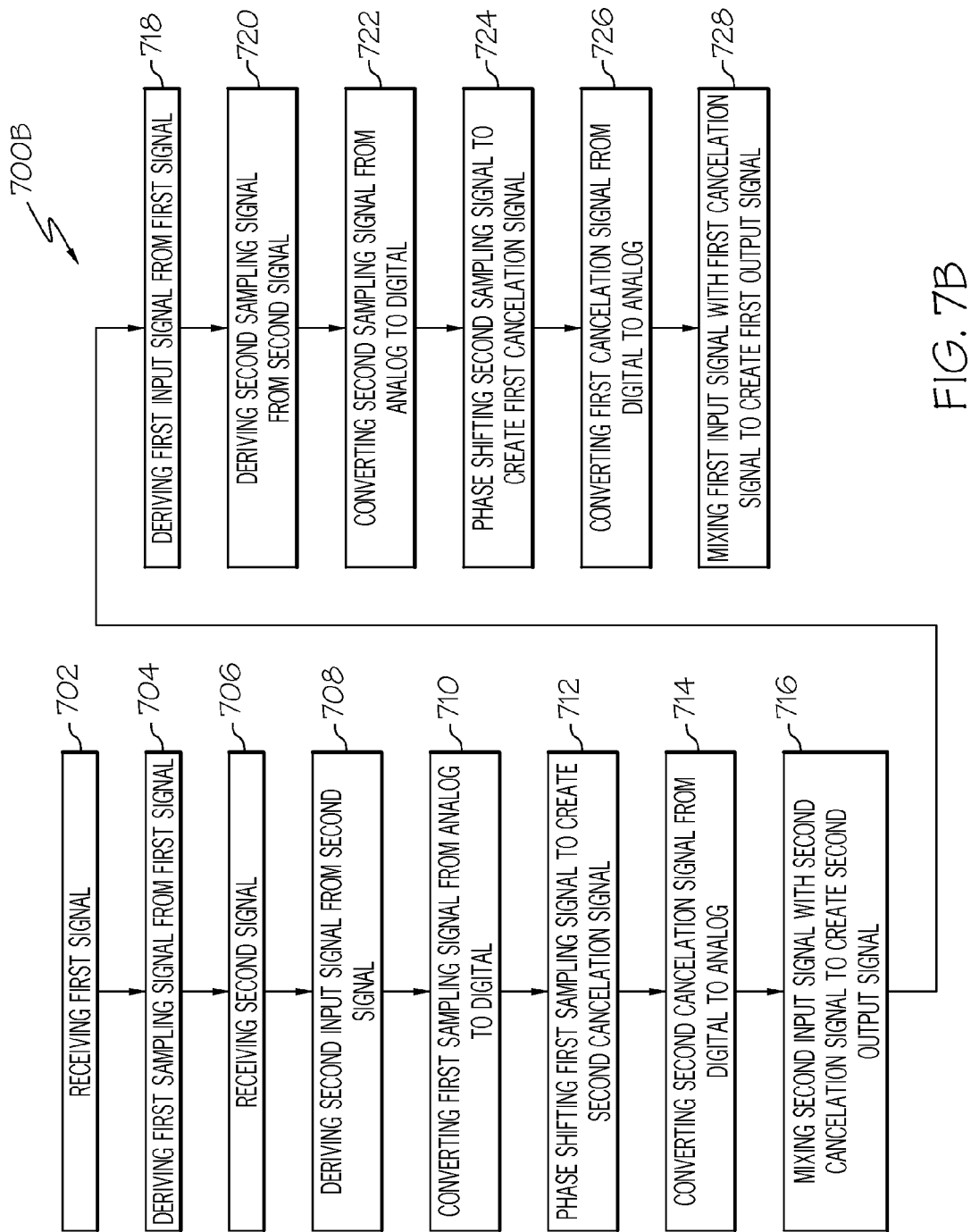

FIGS. 7A-7B are flow diagrams showing embodiments of a method 700 of performing interference cancelation using a dual low-noise amplifier system having a DSP, such as the dual low-noise amplifier system 100. Each of FIGS. 7A-7B shows a different embodiment of a method 700. The various embodiments of the method are labeled method 700A and method 700B. While method 700A and method 700B are described with reference to elements of system 100, it is understood that the method can also be performed using other systems.

FIG. 7A shows an exemplary embodiment of a method flow diagram, labeled method 700A. The method 700A begins at block 702, where a first signal is received at the low-noise amplifier system 100. In some example embodiments, the first signal is received at the first input 112-1 from the first antenna 120-1. In some example embodiments, the first signal is a radio frequency (RF) signal. At block 704, a first sampling signal is derived from the first signal. In some example embodiments, the first sampling signal is split from the first signal by the splitter 110-1.

At block 706, a second signal is received at the low-noise amplifier system 100. In some example embodiments, the second signal is received at the second input 112-2 from the second antenna 120-2. At block 708, a second input signal is derived from the second signal. In some example embodiments, the second input signal is split from the second signal by the splitter 110-2.

At block 710, the first sampling signal is converted from analog to digital. In some example embodiments, the first sampling signal is converted from analog to digital by the first ADC 202-1 shown in FIGS. 2A-2H and described above. In some example embodiments, filtering, amplification, and/or attenuation (or other types of signal conditioning) are performed on the first sampling signal before it is converted from analog to digital.

At block 712, the first sampling signal is phase shifted to create a second cancelation signal. In some example embodiments, the first sampling signal is phase shifted by the first phase shifter 206-1 shown in FIGS. 2A-2H and described above. In some example embodiments, filtering, amplification, and/or attenuation (or other types of signal conditioning) are performed on the first sampling signal before it is phase shifted.

At block 714, the second cancelation signal is converted from digital to analog. In some example embodiments, the second cancelation signal is converted from digital to analog by the first DAC 204-1 shown in FIGS. 2A-2H and described above. In some example embodiments, filtering, amplification, and/or attenuation (or other types of signal conditioning) are performed on the second cancelation signal before it is converted from digital to analog.

At block 716, the second input signal is mixed with the second cancelation signal to create a second output signal. In some example embodiments, the second input signal is mixed with the second cancelation signal by the mixer 506-2 shown in FIG. 5A and described above. In some example embodiments, filtering, amplification, and/or attenuation (or other types of signal conditioning) are performed on the second input signal before it is mixed with the second cancelation signal. In some example embodiments, filtering, amplification, and/or attenuation (or other types of signal conditioning) are performed on the second cancelation signal before it is mixed with the first input signal. In some example embodiments, filtering, amplification, and/or attenuation (or other types of signal conditioning) are performed on the second output signal.

FIG. 7B shows an exemplary embodiment of a method flow diagram, labeled method 700B. The method 700B shares blocks 702, 704, 706, 708, 710, 712, 714, and 716 with method 700A shown in FIG. 7A and described above. Because these elements of method 700B have already been described, only the blocks that are new to method 700B are described below.

At block 718, a first input signal is derived from the first signal. In some example embodiments, the first input signal is split from the first signal by the splitter 110-1. At block 720, a second sampling signal is derived from the second signal. In some example embodiments, the second sampling signal is split from the second signal by the splitter 110-2.

At block 722, the second sampling signal is converted from analog to digital. In some example embodiments, the second sampling signal is converted from analog to digital by the second ADC 202-2 shown in FIGS. 2E-2H and described above. In some example embodiments, filtering, amplification, and/or attenuation (or other types of signal conditioning) are performed on the first sampling signal before it is converted from analog to digital.

At block 724, the second sampling signal is phase shifted to create a first cancelation signal. In some example embodiments, the second sampling signal is phase shifted by the second phase shifter 206-2 shown in FIGS. 2E-2H and described above. In some example embodiments, filtering, amplification, and/or attenuation (or other types of signal conditioning) is performed on the second sampling signal before it is phase shifted.

At block 726, the first cancelation signal is converted from digital to analog. In some example embodiments, the first cancelation signal is converted form digital to analog by the second first DAC 204-1 shown in FIGS. 2E-2H and described above. In some example embodiments, filtering, amplification, and/or attenuation (or other types of signal conditioning) are performed on the first cancelation signal before it is converted from digital to analog.

At block 728, the first input signal is mixed with the first cancelation signal to create a first output signal. In some example embodiments, the first input signal is mixed with the first cancelation signal using a different mixer 506-1, shown in FIG. 5B, that operates in a similar manner to mixer 506-2 shown in FIG. 5A and described above. In some example embodiments, filtering, amplification, and/or attenuation (or other types of signal conditioning) are performed on the first input signal before it is mixed with the second cancelation signal. In some example embodiments, filtering, amplification, and/or attenuation (or other types of signal conditioning) are performed on the first cancelation signal before it is mixed with the first input signal. In some example embodiments, filtering, amplification, and/or attenuation (or other types of signal conditioning) are performed on the first output signal.

Figure 8B:
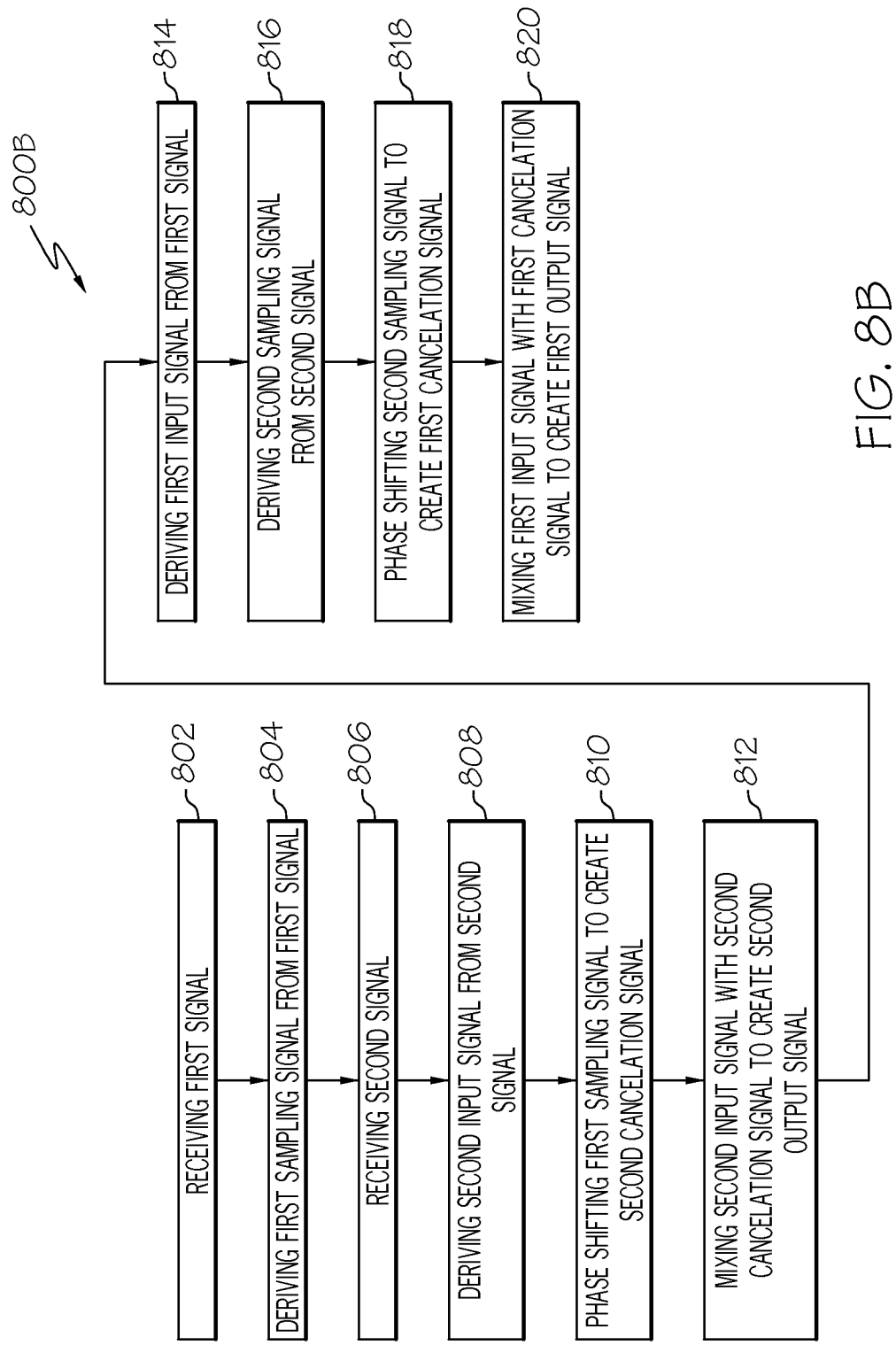

FIGS. 8A-8B are flow diagrams showing embodiments of a method 800 of performing interference cancelation using a dual low-noise amplifier system having an ASP, such as the dual low-noise amplifier system 300. Each of FIGS. 8A-8B shows a different embodiment of a method 800. The various embodiments of the method are labeled method 800A through method 800B. While method 800A and method 800B are described with reference to elements of system 300, it is understood that the method can also be performed using other systems.

FIG. 8A shows an exemplary embodiment of a method flow diagram, labeled method 800A. The method 800A begins at block 802, where a first signal is received at the low-noise amplifier system 300. In some example embodiments, the first signal is received at the first input 112-1 from the first antenna 120-1. In some example embodiments, the first signal is a radio frequency (RF) signal. At block 804, a first sampling signal is derived from the first signal. In some example embodiments, the first sampling signal is split from the first signal by the splitter 110-1.

At block 806, a second signal is received at the low-noise amplifier system 100. In some example embodiments, the second signal is received at the second input 112-2 from the second antenna 120-2. At block 808, a second input signal is derived from the second signal. In some example embodiments, the second input signal is split from the second signal by the splitter 110-2.

At block 810, the first sampling signal is phase shifted to create a second cancelation signal. In some example embodiments, the first sampling signal is phase shifted by the first phase shifter 206-1 shown in FIGS. 2A-2H and described above. In some example embodiments, filtering, amplification, and/or attenuation (or other types of signal conditioning) are performed on the first sampling signal before it is phase shifted.

At block 812, the second input signal is mixed with the second cancelation signal to create a second output signal. In some example embodiments, the second input signal is mixed with the second cancelation signal by the mixer 506-2 shown in FIG. 5A and described above. In some example embodiments, filtering, amplification, and/or attenuation (or other types of signal conditioning) are performed on the second input signal before it is mixed with the second cancelation signal. In some example embodiments, filtering, amplification, and/or attenuation (or other types of signal conditioning) are performed on the second cancelation signal before it is mixed with the first input signal. In some example embodiments, filtering, amplification, and/or attenuation (or other types of signal conditioning) are performed on the second output signal.

FIG. 8B shows an exemplary embodiment of a method flow diagram, labeled method 800B. The method 800B shares blocks 802, 804, 806, 808, 810, and 812 with method 800A shown in FIG. 8A and described above. Because these elements of method 800B have already been described, only the blocks that are new to method 800B are described below.

At block 814, a first input signal is derived from the first signal. In some example embodiments, the first input signal is split from the first signal by the splitter 110-1. At block 816, a second sampling signal is derived from the second signal. In some example embodiments, the second sampling signal is split from the second signal by the splitter 110-2.

At block 818, the second sampling signal is phase shifted to create a first cancelation signal. In some example embodiments, the second sampling signal is phase shifted by the second phase shifter 206-2 shown in FIGS. 2E-2H and described above. In some example embodiments, filtering, amplification, and/or attenuation (or other types of signal conditioning) is performed on the second sampling signal before it is phase shifted.

At block 820, the first input signal is mixed with the first cancelation signal to create a first output signal. In some example embodiments, the first input signal is mixed with the first cancelation signal using a first mixer 506-1, shown in FIG. 5B, that operates in a similar manner to mixer 506-2 shown in FIG. 5A and described above. In some example embodiments, filtering, amplification, and/or attenuation (or other types of signal conditioning) are performed on the first input signal before it is mixed with the first cancelation signal. In some example embodiments, filtering, amplification, and/or attenuation (or other types of signal conditioning) are performed on the first cancelation signal before it is mixed with the first input signal. In some example embodiments, filtering, amplification, and/or attenuation (or other types of signal conditioning) are performed on the first output signal.

Exemplary embodiments of the system 100 are described above as including various components, such as EMA 102-1, EMA 102-2, DSP 104, ASP 302, etc. It is understood that some or all of these components can be implemented using discrete components or using a processing unit having at least one programmable processor. In some embodiments, the processing unit includes or functions with software programs, firmware or other computer readable instructions for carrying out various methods, process tasks, calculations, and control functions, described in the systems and methods above.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

While embodiments of the invention described above utilize two TMAs, in other example embodiments greater than two TMAs are utilized to cancel noise and interference in signals according to the description above. In addition, while embodiments of the invention described above utilize two antennas, in other example embodiments greater than two antennas are utilized to cancel noise and interference in signals according to the description above. While first signal and second signal are described as radio frequency signals, these signals can be other types of signals in other embodiments.

Although specific embodiments have been illustrated and described herein, it will be appreciated by those of ordinary skill in the art that any arrangement, which is calculated to achieve the same purpose, may be substituted for the specific embodiments shown. For example, although the exemplary embodiments described above were described as separate embodiments, it is understood that features of one embodiment could be used as features in another embodiment. Therefore, it is manifestly intended that this invention be limited only by the claims and the equivalents thereof.

What is claimed is:

1. A system, comprising:
    a first external mounted amplifier having a first low-noise amplifier coupled to a first antenna, the first low-noise amplifier operable to receive a first signal from the first antenna;

a second external mounted amplifier having a second low-noise amplifier coupled to a second antenna, the second low-noise amplifier operable to receive a second signal from the second antenna, wherein the second low-noise amplifier amplifies a second input signal derived from the second signal;

a first splitter coupled between the first antenna and the first low-noise amplifier, the first splitter operable to derive a first sampling signal from the first signal;

a first phase shifter coupled to the first splitter, the first phase shifter operable to shift the phase of the first sampling signal to create a second cancelation signal; and a second mixer coupled to the first phase shifter, the second mixer operable to mix a second input signal derived from the second signal with the second cancelation signal to create a second output signal.

2. The system of claim 1, further comprising:
a second splitter coupled between the second antenna and the second low-noise amplifier, the second splitter operable to derive the second input signal from the second signal; and
wherein the second mixer is further coupled to the second splitter.

3. The system of claim 1, further comprising at least one of:
a first signal level adjustment device coupled to an output of the second mixer, the first signal level adjustment device operable to perform at least one of amplification and attenuation on the second output signal;
a second signal level adjustment device coupled between the first phase shifter and the second mixer, the second signal level adjustment device operable to perform at least one of amplification and attenuation on the second cancelation signal before the second cancelation signal is mixed with the second input signal at the second mixer; and
a third signal level adjustment device coupled between the first splitter and the first phase shifter, the third signal level adjustment device operable to perform at least one of amplification and attenuation on the first sampling signal before the first sampling signal is phase shifted by the first phase shifter to create the second cancelation signal.

4. The system of claim 1, further comprising at least one of:
a first filter coupled to an output of the second mixer, the first filter operable to filter the second output signal;
a second filter coupled to an input of the second mixer, the second filter operable to filter the second cancelation signal before the second cancelation signal is mixed with the second input signal at the second mixer; and
a third filter coupled between the first splitter and the first phase shifter, the third filter operable to filter the first sampling signal before the first sampling signal is phase shifted by the first phase shifter to create the second cancelation signal.

5. The system of claim 1, wherein at least one of the first signal received from the first antenna and the second signal received from the second antenna is a radio frequency signal.

6. The system of claim 1, further comprising:
a base station transceiver coupled to the second mixer and operable to receive the second output signal.

7. The system of claim 6, further comprising:
a first duplexer operable to duplex the first output signal sent to the base station receiver onto the same medium as a first downstream signal received from the base station receiver.

8. The system of claim 7, further comprising:
a second duplexer operable to duplex both the first signal received from the first antenna and the first downstream signal received from the base station receiver onto the first antenna.

9. The system of claim 1, further comprising:
wherein the first splitter is further operable to derive a first input signal from the first signal;
wherein the first low-noise amplifier amplifies the first input signal;
a second splitter coupled between the second antenna and the second low-noise amplifier, the second splitter operable to derive a second sampling signal and the second input signal from the second signal;
a second phase shifter coupled to the second splitter, the second phase shifter operable to shift the phase of the second sampling signal to create a first cancelation signal; and
a first mixer coupled to the second phase shifter, the first mixer operable to mix the first input signal with the first cancelation signal to create a first output signal.

10. The system of claim 9, further comprising at least one of:
a first signal level adjustment device coupled to an output of the first mixer, the first signal level adjustment device operable to perform at least one of amplification and attenuation on the first output signal;
a second signal level adjustment device coupled between the second phase shifter and the first mixer, the second signal level adjustment device operable to perform at least one of amplification and attenuation on the first cancelation signal before the first cancelation signal is mixed with the first input signal at the first mixer; and
a third signal level adjustment device coupled between the second splitter and the second phase shifter, the third signal level adjustment device operable to perform at least one of amplification and attenuation on the second sampling signal before the second sampling signal is phase shifted by the second phase shifter to create the first cancelation signal.

11. The system of claim 9, further comprising at least one of:
a first filter coupled to an output of the first mixer, the first filter operable to filter the first output signal;
a second filter coupled to an input of the first mixer, the second filter operable to filter the first cancelation signal before the first cancelation signal is mixed with the first input signal at the first mixer; and
a third filter coupled between the second splitter and the second phase shifter, the third filter operable to filter the second sampling signal before the second sampling signal is phase shifted by the second phase shifter to create the first cancelation signal.

12. The system of claim 9, further comprising:
a base station transceiver coupled to the first mixer and the second mixer, wherein the base station transceiver is operable to receive the first output signal from the first mixer and the second output signal from the second mixer.

13. A method, comprising:
receiving a first signal from a first antenna coupled to a first low-noise amplifier of a first external mounted amplifier;
receiving a second signal from a second antenna coupled to a second low-noise amplifier of a second external mounted amplifier;

phase shifting a first sampling signal derived from the first signal to create a second cancelation signal;

amplifying a second input signal derived from the second signal; and mixing the second input signal with the second cancelation signal to create a second output signal.

14. The method of claim 13, further comprising at least one of:

deriving the first sampling signal from the first signal using a first splitter; and deriving the second input signal from the second signal using a second splitter.

15. The method of claim 13, further comprising at least one of:

amplifying the second output signal after mixing the second input signal with the second cancelation signal;

attenuating the second output signal after mixing the second input signal with the second cancelation signal;

amplifying the second cancelation signal before mixing the second input signal with the second cancelation signal;

attenuating the second cancelation signal before mixing the second input signal with the second cancelation signal;

amplifying the first sampling signal before phase shifting the first sampling signal to create the second cancelation signal; and attenuating the first sampling signal before phase shifting the first sampling signal to create the second cancelation signal.

16. The method of claim 13, further comprising at least one of:

filtering the second output signal after mixing the second input signal with the second cancelation signal;

filtering the second cancelation signal before mixing the second input signal with the second cancelation signal; and filtering the first sampling signal before phase shifting the first sampling signal to create the second cancelation signal.

17. The method of claim 13, further comprising at least one of:

converting the first sampling signal from analog to digital; and converting the second cancelation signal from digital to analog.

18. The method of claim 13, further comprising:
receiving the second output signal at a base station receiver.

19. The method of claim 18, further comprising:
duplexing the first output signal onto the same medium as a first downstream signal received from the base station receiver.

20. The method of claim 19, further comprising:
duplexing both the first signal received from the first antenna and the first downstream signal received from the base station receiver onto the first antenna.

21. The method of claim 13, further comprising:
phase shifting a second sampling signal derived from the second signal to create a first cancelation signal;

amplifying a first input signal derived from the first signal; and mixing the first input signal with the first cancelation signal to create a first output signal.

22. The method of claim 21, further comprising at least one of:

deriving the first input signal from the first signal using a first splitter; and deriving the second sampling signal from the second signal using a second splitter.

23. The method of claim 21, further comprising at least one of:

amplifying the first output signal after mixing the first input signal with the first cancelation signal;

attenuating the first output signal after mixing the first input signal with the first cancelation signal;

amplifying the first cancelation signal before mixing the first input signal with the first cancelation signal;

attenuating the first cancelation signal before mixing the first input signal with the first cancelation signal;

amplifying the second sampling signal before phase shifting the second sampling signal to create the first cancelation signal; and attenuating the second sampling signal before phase shifting the second sampling signal to create the first cancelation signal.

24. The method of claim 21, further comprising at least one of:

filtering the first output signal after mixing the first input signal with the first cancelation signal;

filtering the first cancelation signal before mixing the first input signal with the first cancelation signal; and filtering the second sampling signal before phase shifting the second sampling signal to create the first cancelation signal.

25. The method of claim 21, further comprising at least one of:

converting the second sampling signal from analog to digital; and converting the first cancelation signal from digital to analog.

26. The method of claim 21, further comprising:
receiving the first output signal at a base station receiver; and receiving the second output signal at the base station receiver.

27. A system, comprising:
a first external mounted amplifier having a first low-noise amplifier coupled to a first antenna, the first low-noise amplifier operable to receive a first signal from the first antenna;

a second external mounted amplifier having a second low-noise amplifier coupled to a second antenna, the second low-noise amplifier operable to receive a second signal from the second antenna;

wherein the second external mounted amplifier is operable to mix a second input signal derived from the second signal with a first cancelation signal derived from the first signal to create a second output signal.

28. The system of claim 27, further comprising:
wherein the second external mounted amplifier is operable to adjust a signal level of at least one of the second input signal, the first cancelation signal, and the second output signal.

29. The system of claim 27, further comprising:
wherein the second external mounted amplifier is operable to filter at least one of the second input signal, the first cancelation signal, and the second output signal.

30. The system of claim 27, further comprising:
wherein the first external mounted amplifier is operable to mix a first input signal derived from the first signal with a second cancelation signal derived from the second signal to create a first output signal.

31. The system of claim 30, further comprising:

wherein the first external mounted amplifier is operable to adjust a signal level of at least one of the first input signal, the second cancelation signal, and the first output signal.

32. The system of claim 30, further comprising:

wherein the first external mounted amplifier is operable to filter at least one of the first input signal, the second cancelation signal, and the first output signal.

33. A system, comprising:

a first external mounted amplifier having a first low-noise amplifier coupled to a first antenna, the first low-noise amplifier operable to receive a first signal from the first antenna;

a second external mounted amplifier having a second low-noise amplifier coupled to a second antenna, the second low-noise amplifier operable to receive a second signal from the second antenna;

wherein the second external mounted amplifier is operable to mix a second input signal derived from the second signal with a first cancelation signal derived from the first signal to create a second output signal; and a base station coupled to an output of the second external mounted amplifier, the base station operable to receive the second output signal from the second external mounted amplifier.

34. The system of claim 33, further comprising:

a first duplexer operable to duplex the second output signal received at the base station receiver onto a first medium with a first downstream signal received from the base station receiver.

35. The system of claim 34, further comprising:

a second duplexer operable to duplex both the first signal received from the first antenna and the first downstream signal received from the base station receiver onto the first antenna.

36. The system of claim 33, further comprising:

wherein the first external mounted amplifier is operable to mix a first input signal derived from the first signal with a second cancelation signal derived from the second signal to create a first output signal.

37. The system of claim 36, further comprising:

a first duplexer operable to duplex the second output signal received at the base station receiver onto a first medium with a first downstream signal received from the base station receiver.

38. The system of claim 37, further comprising:

a second duplexer operable to duplex both the first signal received from the first antenna and the first downstream signal received from the base station receiver onto the first antenna.

\* \* \* \* \*